US012776678B2

(12) United States Patent
Lee et al.

(10) Patent No.: US 12,776,678 B2
(45) Date of Patent: Oct. 27, 2026

(54) COIL MEMBER COMPRISING A CIRCUIT PATTERN INCLUDING A PLURALITY OF METAL LAYERS SEQUENTIALLY STACKED AND CAMERA MODULE COMPRISING SAME

(71) Applicant: LG INNOTEK CO., LTD., Seoul (KR)

(72) Inventors: Seung Jin Lee, Seoul (KR); Hyung Kyu Yoon, Seoul (KR); Hye Yeong Jung, Seoul (KR); Jung Hun Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 457 days.

(21) Appl. No.: 18/255,290

(22) PCT Filed: Jan. 4, 2022

(86) PCT No.: PCT/KR2022/000075
§ 371 (c)(1),
(2) Date: May 31, 2023

(87) PCT Pub. No.: WO2022/146127
PCT Pub. Date: Jul. 7, 2022

(65) Prior Publication Data

US 2024/0006945 A1 Jan. 4, 2024

(30) Foreign Application Priority Data

Jan. 4, 2021 (KR) ........................ 10-2021-0000161
Jan. 4, 2021 (KR) ........................ 10-2021-0000211

(51) Int. Cl.
*H02K 3/26* (2006.01)
*G03B 5/02* (2021.01)
(Continued)

(52) U.S. Cl.
CPC ................ *H02K 3/26* (2013.01); *G03B 5/02* (2013.01); *H01F 27/2804* (2013.01); *H02K 3/44* (2013.01);
(Continued)

(58) Field of Classification Search
CPC . H02K 3/44; H02K 41/0354; H01F 2007/068
See application file for complete search history.

(56) References Cited

U.S. PATENT DOCUMENTS 6,035,528 A 3/2000 Murata
6,727,571 B2 4/2004 Sugiyama et al.
(Continued)

FOREIGN PATENT DOCUMENTS

CN 101798224 A 8/2010
CN 111308639 A 6/2020
(Continued)

OTHER PUBLICATIONS

Office Action dated Aug. 9, 2023 in Taiwanese Application No. 111100285.

(Continued)

*Primary Examiner* — Paul C Lee
(74) *Attorney, Agent, or Firm* — SALIWANCHIK, LLOYD & EISENSCHENK

(57) ABSTRACT

A coil member according to an embodiment comprises: a substrate having a first surface and a second surface opposite to the first surface; a first circuit pattern disposed on the first surface; and a plurality of bridge portions protruding from an end of the substrate, wherein the bridge portions are integrally formed with the substrate, and a shield layer is disposed on the bridge portions.

20 Claims, 14 Drawing Sheets

(51) Int. Cl.
*H01F 27/28* (2006.01)
*H02K 3/44* (2006.01)
*H02K 41/035* (2006.01)

(52) U.S. Cl.
CPC ..... *H02K 41/0354* (2013.01); *H02K 2203/03* (2013.01)

(56) References Cited

U.S. PATENT DOCUMENTS

| | | | | |
|---|---|---|---|---|
| 11,581,117 | B2 | 2/2023 | Yosui et al. | |
| 2003/0098496 | A1 | 5/2003 | Sugiyama et al. | |
| 2015/0153539 | A1 | 6/2015 | Yoo et al. | |
| 2015/0302987 | A1 * | 10/2015 | Sano | H01F 41/041 29/602.1 |
| 2017/0365389 | A1 | 12/2017 | Yosui et al. | |
| 2020/0033551 | A1 * | 1/2020 | Lee | G02B 7/08 |
| 2020/0294712 | A1 | 9/2020 | Kim et al. | |
| 2020/0328023 | A1 | 10/2020 | Kim | |
| 2023/0408839 | A1 * | 12/2023 | Lee | H01F 17/0006 |

FOREIGN PATENT DOCUMENTS

| | | | | | |
|---|---|---|---|---|---|
| CN | 111696748 | A | | 9/2020 | |
| CN | 111816424 | A | | 10/2020 | |
| JP | 5-161294 | A | | 6/1993 | |
| JP | 2004-22606 | A | | 1/2004 | |
| JP | 2013-175659 | A | | 9/2013 | |
| JP | 2015-177092 | A | | 10/2015 | |
| JP | 6213698 | B2 | | 10/2017 | |
| KR | 1999-007388 | A | | 1/1999 | |
| KR | 19990007388 | A | * | 1/1999 | H01L 21/78 |
| KR | 10-2003-0043645 | A | | 6/2003 | |
| KR | 10-2008-0038767 | A | | 5/2008 | |
| KR | 10-2010-0022731 | A | | 3/2010 | |
| KR | 10-2011-0076050 | A | | 7/2011 | |
| KR | 10-2015-0009152 | A | | 1/2015 | |
| KR | 10-2015-0064997 | A | | 6/2015 | |
| KR | 10-2015-0082406 | A | | 7/2015 | |
| KR | 20160000164 | A | * | 1/2016 | H01F 17/0013 |
| TW | 373199 | B | | 11/1999 | |

OTHER PUBLICATIONS

International Search Report dated Apr. 26, 2022 in International Application No. PCT/KR2022/000075.

Office Action dated Mar. 27, 2025 in Korean Application No. 10-2021-0000211.

Office Action dated May 26, 2026 in Chinese Application No. 202280009018.0.

* cited by examiner

COIL MEMBER COMPRISING A CIRCUIT PATTERN INCLUDING A PLURALITY OF METAL LAYERS SEQUENTIALLY STACKED AND CAMERA MODULE COMPRISING SAME

CROSS-REFERENCE TO RELATED APPLICATIONS

This application is the U.S. national stage application of International Patent Application No. PCT/KR2022/000075, filed Jan. 4, 2022, which claims the benefit under 35 U.S.C. § 119 of Korean Application Nos. 10-2021-0000161, filed Jan. 4, 2021; and 10-2021-0000211, filed Jan. 4, 2021; the disclosures of each of which are incorporated herein by reference in their entirety.

TECHNICAL FIELD

Embodiments relate to a coil member and a camera module including the same.

BACKGROUND ART

As various portable terminals are widely used and the wireless Internet service is commercialized, needs of consumers related to the portable terminals are diversified, and accordingly, various kinds of additional devices are installed in the portable terminals.

A representative one of them is a camera module that may photograph a subject in a photograph or a moving image, store the image data, and then edit and transmit the image data as needed.

In recent years, there has been an increasing demand for small camera modules for use in various multimedia fields such as note type personal computers, camera phones, PDAs, smart devices, toys, etc., and for image input devices such as surveillance cameras and information terminals of video tape recorders.

Conventional camera modules are roughly classified into fixed focus (F.F) type, auto focus (A.F) type, and optical image stabilization (OIS) type camera modules.

Meanwhile, in the case of the OIS type, a coil member disposed on a circuit board may be included as a component for realizing a camera shake prevention function.

Such a coil member may be formed by disposing a coil-shaped electrode on a substrate.

Meanwhile, in the coil member, individual coil members may be manufactured by forming a region where a plurality of coil members are disposed on a large-area substrate, forming a circuit pattern of the coil member in a plurality of regions, and then cutting each coil member using a laser.

Accordingly, there is an advantage that the plurality of coil members may be manufactured at once, but since a post-treatment process for separating the individual coil members is required, there is a problem that failures occur during the post-treatment process or process efficiency is reduced.

Therefore, there is a need for a coil member capable of solving the above problems and a camera module including the same.

DISCLOSURE

Technical Problem

An embodiment is directed to providing a coil member that may be easily manufactured and has improved reliability and a camera module including the same.

Technical Solution

A coil member according to an embodiment includes: a substrate including a first surface and a second surface opposite to the first surface; a first circuit pattern disposed on the first surface; and a plurality of bridge portions disposed protruding from an end of the substrate, wherein the bridge portion is integrally formed with the substrate, and a shield layer is disposed on the bridge portion.

Advantageous Effects

A coil member according to an embodiment may include a bridge portion. Accordingly, it is possible to easily cut the coil member through a bridge portion B. That is, the coil member can be easily cut by human force without a separate device or a separate post-treatment process.

Accordingly, it is possible to easily store and separate unit coil members from a coil member assembly disposed in plural on the large-area substrate. That is, the unit coil members may separate as many coil members as necessary, and remaining unit coil members may be stored while being fixed to the coil member assembly. Accordingly, it is possible to inhibit the separate post-treatment process from being required whenever the unit coil members are separated, thereby improving process efficiency.

In addition, since a plurality of unit coil members may be fixed and stored in one coil member assembly at once, thereby easily storing the coil member.

In addition, since shield layers are disposed on both surfaces of the bridge portion, it is possible to inhibit external moisture or impurities from penetrating into the coil member through the bridge portion, thereby improving the reliability of the coil member.

In addition, since the shield layers are disposed on both surfaces of the bridge portion, it is possible to inhibit the formation of a step in the bridge portion and a protective layer of a region adjacent to the bridge portion, thereby inhibiting adhesion failure due to the step when the coil member is applied to a camera module.

A coil member according to a second embodiment may include a bridge portion. In detail, the bridge portion may be disposed at a position overlapping a region where a plating pattern is disposed. Accordingly, it is possible to easily cut the coil member through the bridge portion B. That is, the coil member may be easily cut by human force without a separate device or a separate post-treatment process.

Accordingly, it is possible to easily store and separate the unit coil members from the coil member assembly disposed in plural on the large-area substrate. That is, the unit coil members may separate as many coil members as necessary, and the remaining unit coil members may be stored while being fixed to the coil member assembly. Accordingly, it is possible to inhibit the separate post-treatment process from being required whenever the unit coil members are separated, thereby improving process efficiency.

In addition, since a plurality of unit coil members may be fixed and stored in one coil member assembly at once, thereby easily storing the coil members.

In addition, since the bridge portion is disposed at a position overlapping a plating line, that is, the plating pattern, a process of irradiating a laser to the region where the plating pattern is disposed is not required when the unit coil member is separated.

Accordingly, when the region where the plating pattern is disposed is cut, a substrate around the plating pattern may be removed together to inhibit the plating pattern from being disposed to protrude from an end of the substrate.

In addition, since a shield layer may be disposed on the plating pattern disposed on the bridge portion, corrosion of the plating pattern may be effectively inhibited by the shield layer, thereby improving the reliability of the coil member.

In addition, since the shield layers are disposed on both surfaces of the bridge portion, it is possible to inhibit the formation of a step in the bridge portion and the region adjacent to the bridge portion, thereby inhibiting adhesion failure due to the step when the coil member is applied to the camera module.

MODES OF THE INVENTION

Hereinafter, embodiments of the present disclosure will be described in detail with reference to the accompanying drawings. However, the spirit and scope of the present disclosure is not limited to a part of the embodiments described, and may be implemented in various other forms, and within the spirit and scope of the present disclosure, one or more of the elements of the embodiments may be selectively combined and replaced.

In addition, unless expressly otherwise defined and described, the terms used in the embodiments of the present disclosure (including technical and scientific terms) may be construed the same meaning as commonly understood by one of ordinary skill in the art to which the present disclosure belongs, and the terms such as those defined in commonly used dictionaries may be interpreted as having a meaning that is consistent with their meaning in the context of the relevant art.

In addition, the terms used in the embodiments of the present disclosure are for describing the embodiments and are not intended to limit the present disclosure. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present disclosure, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, a coil member according to an embodiment will be described with reference to the drawings.

First, a coil member according to a first embodiment will be described with reference to FIGS. 1 to 8.

Figure 1:
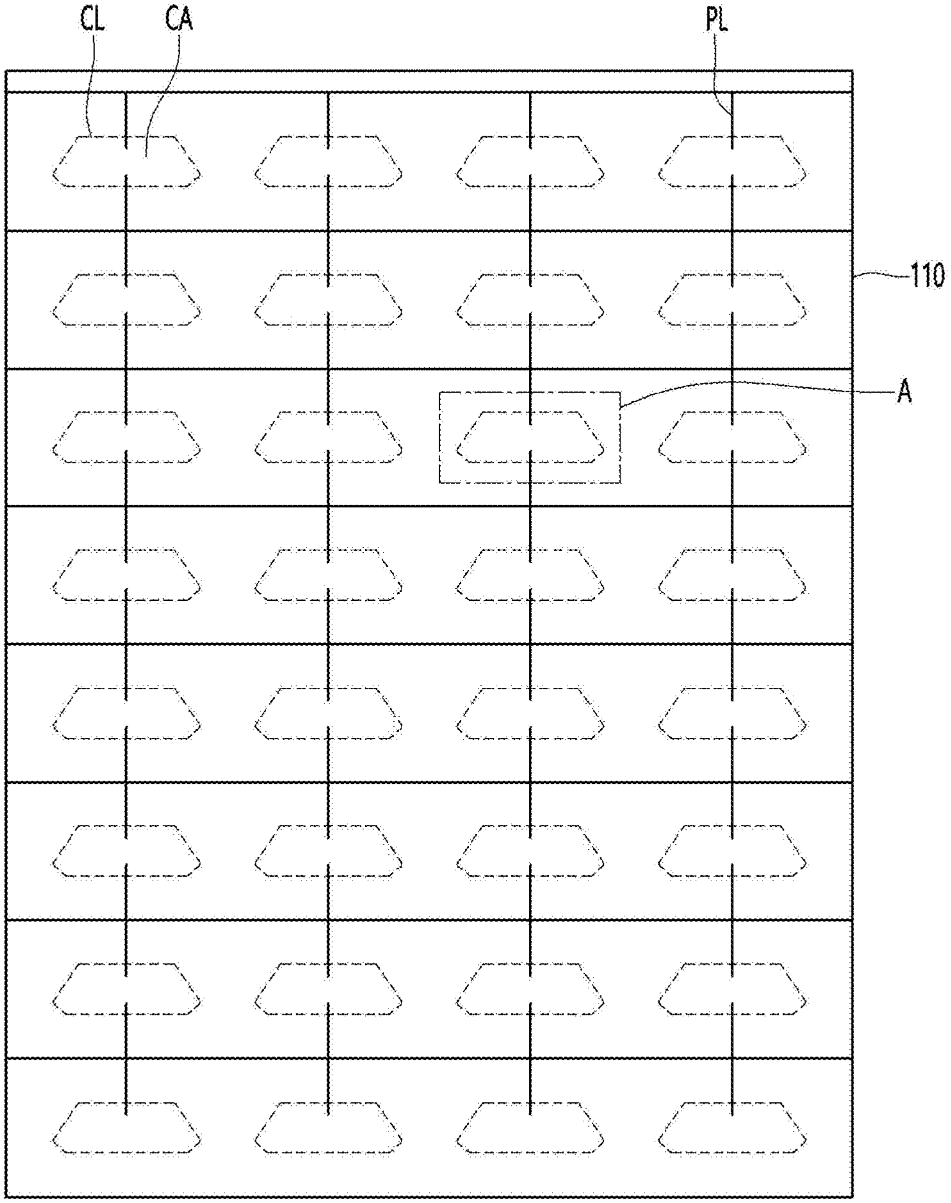
FIG. 1 is a view for describing a cutting process of a coil member according to a first embodiment.
Figure 2:
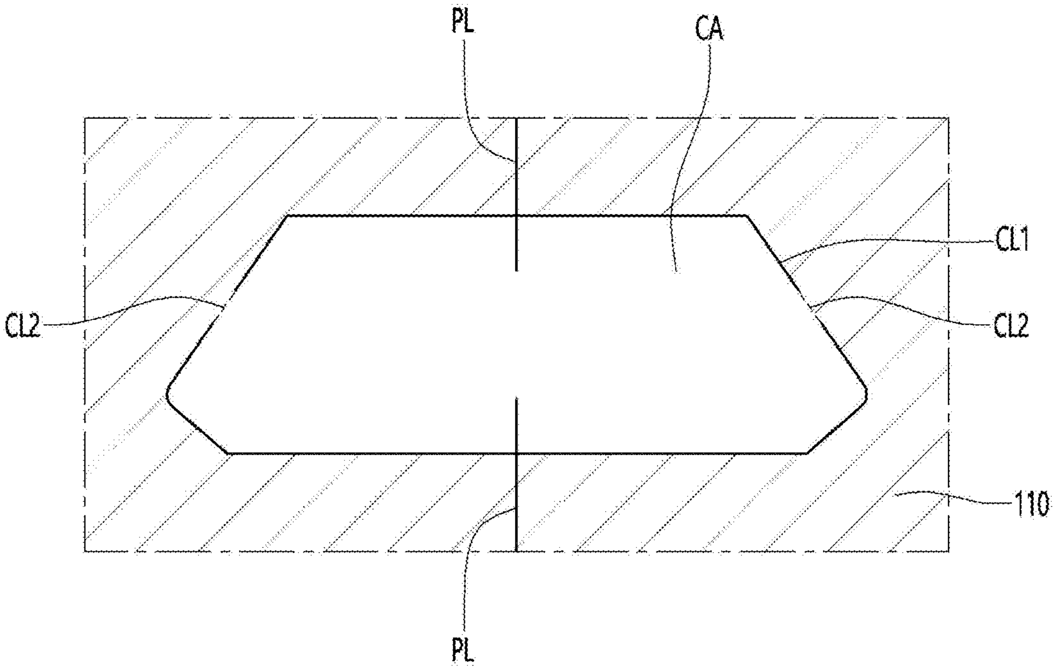
FIG. 2 is an enlarged view of region A in FIG. 1.
Figure 3:
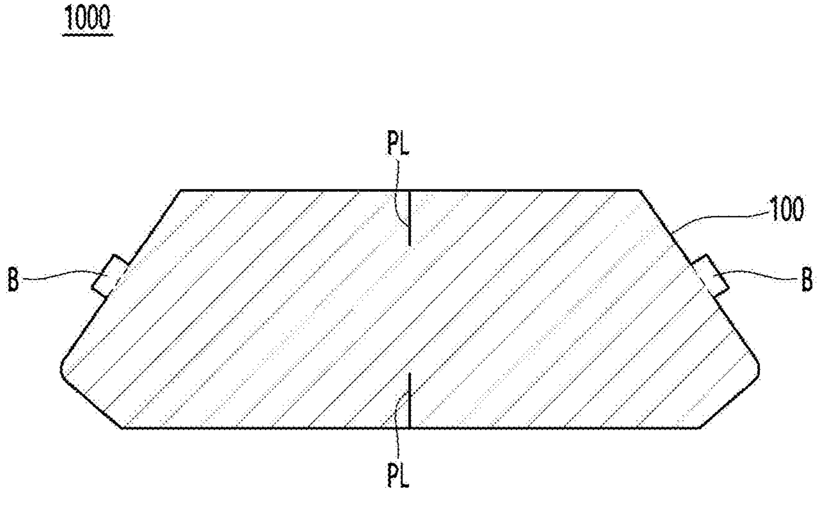
FIG. 3 is a view showing one coil member cut according to the cutting process of the coil member according to the first embodiment.

FIGS. 1 to 3 are views for describing a manufacturing process of the coil member according to the first embodiment and an outer shape of the coil member manufactured by the manufacturing process.

Referring to FIGS. 1 and 2, a plurality of coil member regions CA may be formed on a substrate 110, and a circuit pattern (not shown) forming the coil member may be formed inside the coil member region CA. Accordingly, a plurality of coil member in which the circuit pattern is formed may be formed on the substrate 110.

Plating lines PL for forming the circuit pattern of the coil member may be disposed outside the coil member region CA. The plating line PL may be connected to each coil member, and a circuit pattern including a plating layer may be formed by transmitting a current to the coil member through the plating line PL.

The plating line PL may include two plating lines PL of a cathode and an anode, and the two plating lines PL may be connected to one coil member region CA. That is, each of the coil member regions CA may be connected to two plating lines transmitting current to one surface of the substrate 110 and two plating lines transmitting current to the other surface of the substrate 110.

Alternatively, one plating line transmitting current to one surface of the substrate 110 may be connected to each of the coil member regions CA, and one plating line transmitting current to the other surface of the substrate 110 may be connected to each of the coil member regions CA. In other words, at least two or more plating lines may be connected to one surface or the other surface of the substrate in the coil member region.

Subsequently, the substrate 110 may be cut. In detail, the substrate 110 may be cut along a cutting line CL of a plurality of coil member regions CA disposed on the substrate 110.

Referring to FIG. 2, the cutting line CL may be partially cut. That is, the cutting lines CL may not be completely cut, and some regions may not be cut. Accordingly, the cutting line CL may include a first region defined as a cut region CL1 and a second region defined as an uncut region CL2.

The second region may be defined as a region in which the substrate is not completely cut or the substrate is partially cut. Accordingly, the coil member region CA may be connected without being separated from the substrate by the second region.

The second region may be formed in at least two or more. In addition, a plurality of second regions may be disposed to be spaced apart from each other.

Subsequently, when it is desired to apply to a camera module, a required number of coil members may be separated from the substrate. In detail, individual coil members may be separated from the substrate by applying a force or pressure to the coil member region CA to separate the second region.

Accordingly, referring to FIG. 3, the coil member may be separated from the substrate 110 while a bridge portion B formed by cutting the second region is formed.

Therefore, since the coil member according to the embodiment may be easily separated without requiring a mechanism or a separate treatment according to a necessary environment, the coil member may be easily manufactured. In addition, since uncut coil members may be stored while being fixed to the substrate, storage reliability may be improved.

Hereinafter, a coil member including the above-described bridge portion will be described in more detail with reference to FIGS. 4 to 8.

Figure 4:
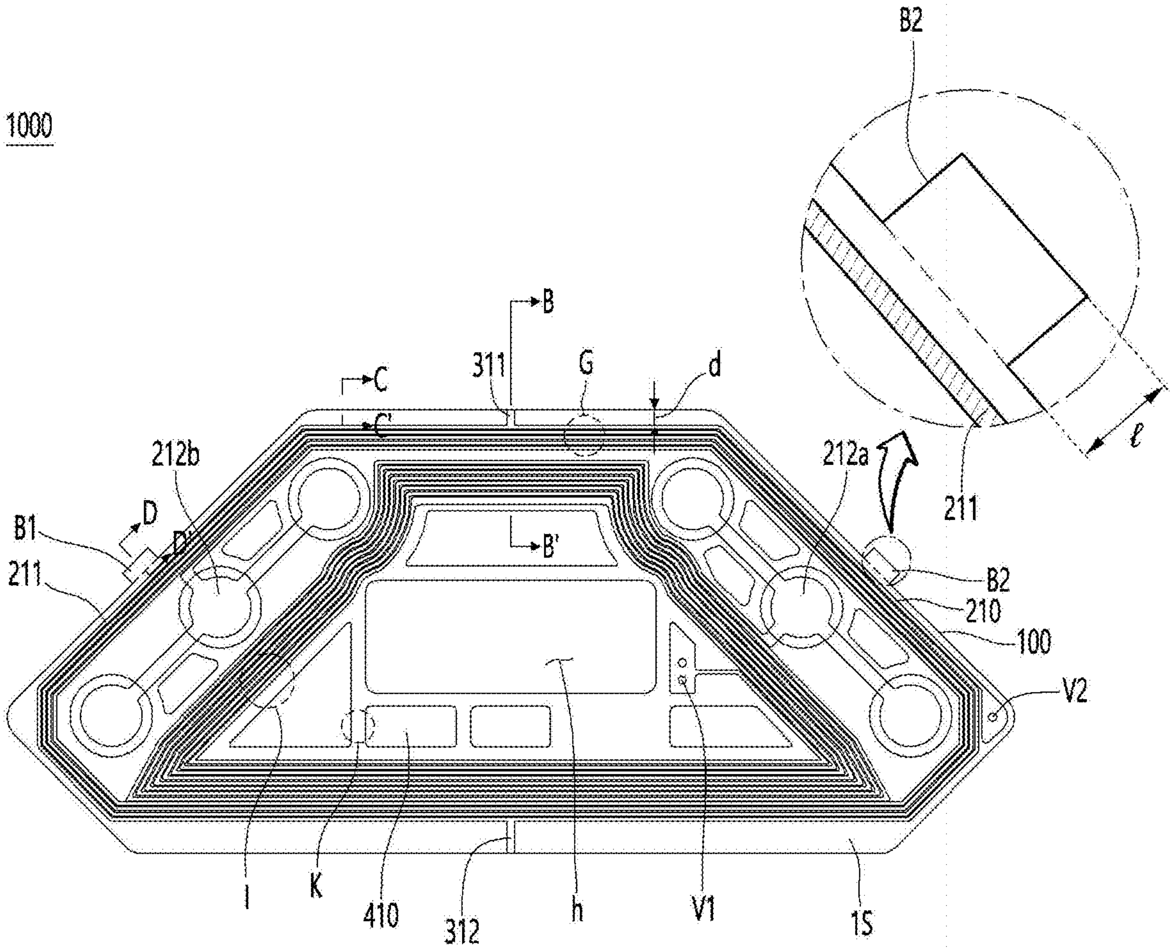
FIG. 4 is a bottom view of the coil member according to the first embodiment.
Figure 5:
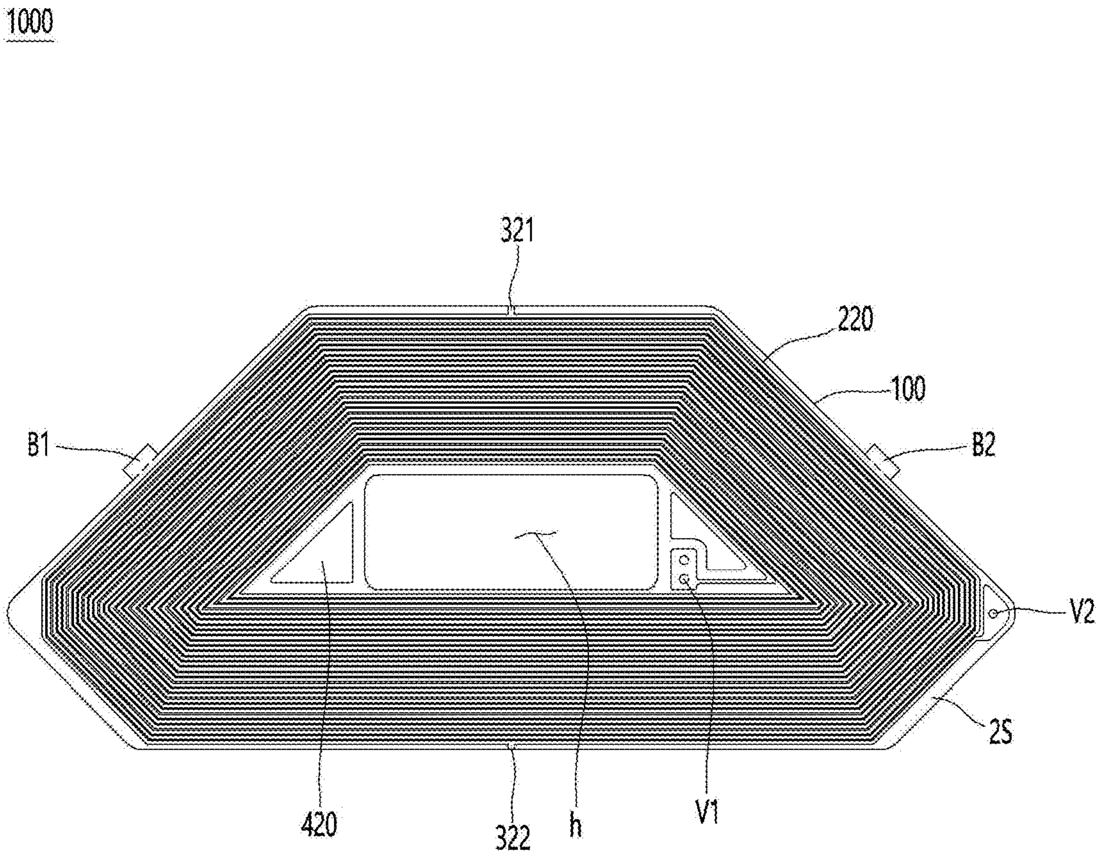
FIG. 5 is a top view of the coil member according to the first embodiment.

FIG. 4 is a bottom view of the coil member according to the embodiment, and FIG. 5 is a top view of the coil member according to the embodiment.

The substrate 100 may be formed by cutting the above-described substrate 110 into a unit coil member 1000.

The substrate 100 may be a flexible substrate. That is, the substrate 100 may include a flexible plastic. For example, the substrate 100 may be a polyimide (PI) substrate. However, the embodiment is not limited thereto, and the substrate 100 may be a substrate made of a polymer material such as polyethylene terephthalate (PET) or polyethylene naphthalate (PEN).

The substrate 100 may be an insulating substrate. That is, the substrate 100 may be the insulating substrate supporting various circuit patterns.

The substrate 100 may have a thickness of 20 μm to 100 μm. For example, the substrate 100 may have a thickness of 25 μm to 75 μm. For example, the substrate 100 may have a thickness of 30 μm to 40 μm. When the thickness of the substrate 100 exceeds 100 μm, the overall thickness of the coil member may increase. In addition, when the thickness of the substrate 100 is less than 20 μm, the substrate 100 may be vulnerable to heat, pressure, or the like in a process of forming a coil electrode of the substrate 100.

A hole h may be formed on the substrate 100. In detail, the hole h passing through the substrate 100 may be formed in a central region of the substrate 100. When the coil member 1000 is applied to a camera module, the hole h may serve as a driving of the camera module, for example, a sensing hole, or the like.

The circuit pattern may be disposed on the substrate 100. In detail, the circuit pattern may be disposed on both surfaces of the substrate 100. That is, the circuit pattern may be disposed on a first surface 1S of the substrate 100 and a second surface 2S opposite to the first surface 1S. That is, the circuit pattern may include a first circuit pattern disposed on the first surface 1S and a second circuit pattern disposed on the second surface 2S.

Alternatively, the circuit pattern may be disposed on the first surface 1S of the substrate 100 or the second surface 2S opposite to the first surface 1S. That is, the circuit pattern may be disposed on at least one of the first surface 1S of the substrate 100 and the second surface 2S opposite to the first surface 1S.

The circuit pattern may include a plurality of types of patterns. In detail, the circuit pattern may include a plurality of types of patterns according to roles, positions, and connection relationships of the patterns. In detail, the circuit pattern may include a wiring pattern, a plating pattern, and a dummy pattern.

Wiring patterns 210 and 220 may include a first wiring pattern 210 and a second wiring pattern 220. In detail, the wiring patterns 210 and 220 may include the first wiring pattern 210 disposed on the first surface 1S of the substrate 100 and the second wiring pattern 220 disposed on the second surface 2S of the substrate 100.

Here, the first surface 1S of the substrate 100 may be defined as a surface facing a printed circuit board of the camera module on which the coil member 1000 is disposed, and the second surface 2S of the substrate 100 may be defined as a surface opposite to the first surface 1S.

The first wiring pattern 210 may be disposed on a lower surface of the coil member 1000. The first wiring pattern 210 may be disposed in a closed loop coil shape on the first surface 1S of the substrate 100. That is, the first wiring pattern 210 may be a first coil pattern disposed on the first surface 1S of the substrate 100.

The first wiring pattern 210 may include a wiring portion 211 and pad portions 212*a* and 212*b*. The first wiring pattern 210 may be electrically connected to the printed circuit board disposed under the coil member 1000 through the pad portions 212*a* and 212*b*. The pad portions 212*a* and 212*b* may be formed in plural, and the embodiment is not limited to the number of pad portions shown in FIGS. 4 and 5.

The second wiring pattern 220 may be disposed on an upper surface of the coil member 1000. The second wiring pattern 220 may be disposed in the closed loop coil shape on the second surface 2S of the substrate 100. That is, the second wiring pattern 220 may be a second coil pattern disposed on the second surface 2S of the substrate 100.

The first wiring pattern 210 and the second wiring pattern 220 may be connected to each other. In detail, the first wiring pattern 210 and the second wiring pattern 220 may be connected to each other through via holes formed in the substrate 100.

In detail, the first wiring pattern 210 may include a first-first connection region and a first-second connection region. A first via hole V1 may be formed in the first-first connection region, and a second via hole V2 may be formed in the first-second connection region.

In addition, the second wiring pattern 220 may include a second-first connection region and a second-second connection region. The first via hole V1 may be formed in the second-first connection region, and the second via hole V2 may be formed in the second-second connection region.

The first via hole V1 or the second via hole V2 may be formed of one or two or more, respectively. When the first via hole V1 or the second via hole V2 is formed in plural, even though a connection failure occurs in any one of the via holes during the process, it is possible to connect in the other via holes, thereby minimizing a characteristic failure of the coil member.

In addition, in order to form the plurality of via holes, the wiring pattern of the connection region may be formed wider than the wiring pattern forming a closed roof. Accordingly, when the first wiring pattern and the second wiring pattern are connected through the connection region, it is possible to inhibit an alignment failure in which the first wiring pattern, the connection region, and the second wiring pattern are not connected.

The first wiring pattern 210 may include a first pad portion 212*a* and a second pad portion 212*b*. When a signal is transmitted from the first pad portion 212*a* on the first surface 1S of the substrate 100 connected to the printed circuit board, the signal may be transmitted to the first-first connection region in a coil shape from the outside to the inside along the first wiring pattern 210 and may be transmitted from the first-first connection region to the second-first connection region of the second surface 2S through the first via hole V1.

Subsequently, the signal may be transmitted to the second-second connection region in the coil shape from the inside to the outside along the second wiring pattern 220 and may be transmitted to the first-second connection region of the first surface 1S through the second via hole V2. Then, the signal may be transmitted to the second pad portion 212*b* along the first wiring pattern 220, and the signal may be transmitted to the printed circuit board again.

The first pad portion 212*a* or the second pad portion 212*b* may be formed of one or two or more pad portions, respectively. In other words, the first pad portion 212*a* or the second pad portion 212*b* may be formed in plurality. Accordingly, it is possible to inhibit a contact failure that may occur when the pad portion and the printed circuit board are connected.

The plating pattern may be the plating line PL remaining on the substrate 100 after cutting the plating line PL described above with reference to FIGS. 1 to 3.

The plating pattern may include a first plating pattern and a second plating pattern. The plating pattern may include the first plating pattern disposed on the first surface 1S of the substrate 100 and including a first-first plating pattern 311 and a first-second plating pattern 312 and the second plating pattern disposed on the second surface 2S of the substrate 100 and including a second-first plating pattern 321 and a second-second plating pattern 322.

Alternatively, the plating pattern may include the first plating pattern disposed on the first surface 1S of the substrate 100 and including at least one of the first-first plating pattern 311 and the first-second plating pattern 312 or the second plating pattern disposed on the second surface 2S of the substrate 100 and including at least one of the second-first plating pattern 321 and the second-second plating pattern 322. That is, the plating pattern may include at least one of the first plating pattern and the second plating pattern.

The first-first plating pattern 311 and the first-second plating pattern 312 may be connected to the first wiring pattern 210. In detail, the first-first plating pattern 311 and the first-second plating pattern 312 may be connected to the first wiring pattern 210 disposed at the outermost portion among the first wiring patterns 210. Accordingly, the first wiring pattern 210 may include a plating layer formed through an electrolytic plating process using a current transmitted through the first-first plating pattern 311 and the first-second plating pattern 312.

In addition, the second-first plating pattern 321 and the second-second plating pattern 322 may be connected to the second wiring pattern 220. In detail, the second-first plating pattern 321 and the second-second plating pattern 322 may be connected to the second wiring pattern 220 disposed at the outermost portion among the second wiring patterns 220. Accordingly, the second wiring pattern 220 may include a plating layer formed through an electrolytic plating process using a current transmitted through the second-first plating pattern 321 and the second-second plating pattern 322.

The first plating pattern may be disposed to extend to an end of the substrate 100. Alternatively, the first plating pattern may be disposed to extend so as to further protrude from the end of the substrate 100.

In addition, the second plating pattern may be disposed to extend to the end of the substrate 100. Alternatively, the second plating pattern may be disposed to extend so as to further protrude from the end of the substrate 100.

When the first plating pattern and the second plating pattern are disposed to protrude from the end of the substrate 100, corrosion may occur in the protruding first plating pattern and the second plating pattern, and the corrosion may extend to the circuit pattern inside the coil member, and thus, the reliability of the coil member may be deteriorated. To inhibit this, a position of the bridge portion B may be changed. This will be described in detail in description of a coil member according to a second embodiment to be described below.

Dummy patterns 410 and 420 may include a first dummy pattern 410 and a second dummy pattern 420. In detail, the dummy patterns 410 and 420 may include the first dummy pattern 410 disposed on the first surface 1S of the substrate 100 and the second dummy pattern 420 disposed on the second surface 2S of the substrate 100.

The first dummy pattern 410 and the second dummy pattern 420 may be respectively disposed on a region where the wiring patterns 210 and 220 and the plating pattern are not disposed on the first surface 1S and the second surface 2S of the substrate 100. That is, the first dummy pattern 410 and the second dummy pattern 420 may be disposed to be spaced apart from the wiring patterns 210 and 220 and the plating pattern.

In addition, the first dummy pattern 410 and the second dummy pattern 420 may be disposed to be disconnected without being connected to other patterns. That is, a signal may not be transmitted to the first dummy pattern 410 and the second dummy pattern 420. That is, no signal is transmitted to the first dummy pattern 410 and the second dummy pattern 420, and the first dummy pattern 410 and the second dummy pattern 420 may be disposed on both sides or one side of the substrate 100 to adjust the degree of plating for each position of the circuit pattern, which is caused by a region with and without the wiring pattern, so that it is possible to secure the width or thickness uniformity of the circuit pattern, and to serve as an alignment mark when forming the wiring patterns.

Figure 6:
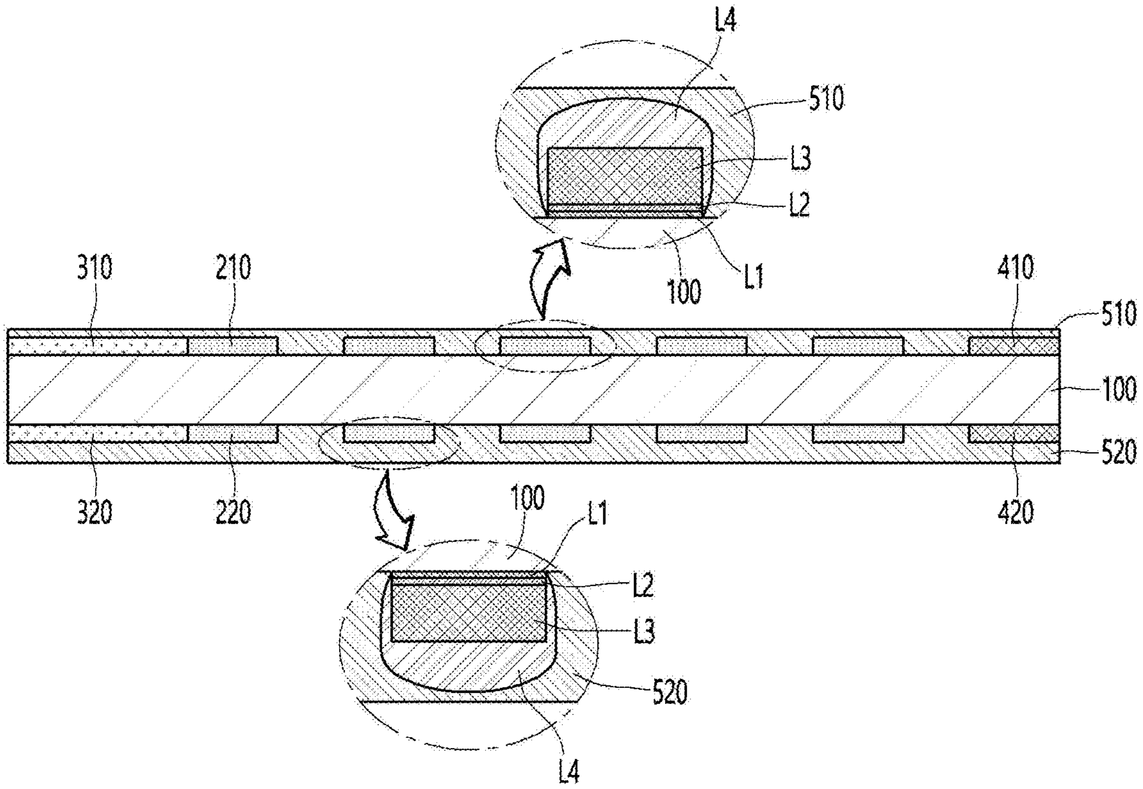
FIG. 6 is a cross-sectional view taken along line B-B' of FIG. 4.

FIG. 6 is a cross-sectional view taken along line B-B' of FIG. 4. That is, FIG. 6 is a cross-sectional view of a region in which the plating pattern and the wiring pattern of the coil member according to the embodiment are connected.

Referring to FIG. 6, the plating patterns 310 and 320 may be disposed to be connected to the wiring patterns 210 and 220. In detail, the plating patterns 310 and 320 may be integrally formed with the wiring patterns 210 and 220. In detail, the first plating pattern 310 may be connected to the first wiring pattern 210 disposed at the outermost portion among the first wiring patterns, and the second plating pattern 320 may be connected to the second wiring pattern 220 disposed at the outermost portion among the second wiring patterns.

That is, the first plating pattern 310 and the first wiring pattern 210 may be integrally formed, and the second plating pattern 320 and the second wiring pattern 220 may be integrally formed.

In addition, the dummy patterns 410 and 420 may be disposed to be spaced apart from the plating patterns 310 and 320 and the wiring patterns 210 and 220. That is, the dummy patterns 410 and 420 may be disposed to be disconnected without being connected to other patterns on the substrate 100.

Since the wiring patterns 210 and 220, the plating patterns 310 and 320, and the dummy patterns 410 and 420 are simultaneously formed by the same process, they may have the same layer structure.

Each of the wiring patterns 210 and 220, the plating patterns 310 and 320, and the dummy patterns 410 and 420 may include a plurality of layers. In detail, the wiring patterns 210 and 220, the plating patterns 310 and 320, and the dummy patterns 410 and 420 may include a plurality of conductive layers. For example, the wiring patterns 210 and 220, the plating patterns 310 and 320, and the dummy patterns 410 and 420 may include a first layer L1, a second layer L2, a third layer L3, and a fourth layer L4 that are disposed to be sequentially stacked on the substrate 100.

The first layer L1 may be disposed on the substrate 100. In detail, the first layer L1 may be disposed in direct contact with the substrate 100.

The first layer L1 may be formed in multiple layers. For example, the first layer L1 may include at least one of nickel, chromium, and titanium. That is, the first layer L1 may include at least one of a nickel layer, a chromium layer, and a titanium layer. For example, the first layer L1 may include the nickel layer and the chromium layer on the nickel layer.

The first layer L1 may be formed through an electroless plating or sputtering process. The first layer L1 may be disposed to have a thin thickness of a thin film. In detail, the first layer L1 may be disposed to have a thickness of 20 nm or less.

The first layer L1 may be a layer that improves adhesion between the second layer L2 disposed on the first layer L1 and the substrate 100. For example, the nickel layer may have good adhesion to the substrate 100, and the chromium layer may have good adhesion to the nickel layer and the second layer L2. Accordingly, the adhesion of the second layer L2 disposed on the substrate 100 may be improved.

The second layer L2 may be disposed on the first layer L1. The second layer L2 may include a material the same as or different from that of the first layer L1. Specifically, the second layer L2 may include a metal material having excellent conductivity. For example, the second layer L2 may include a metal layer including at least one of copper (Cu), aluminum (Al), chromium (Cr), nickel (Ni), silver (Ag), or molybdenum (Mo), gold (Au), titanium (Ti), and alloys thereof. Preferably, the second layer L2 may include copper. That is, the second layer L2 may be a copper layer.

The second layer L2 may be formed through the electroless plating. The second layer L2 may be disposed to have a thickness greater than that of the first layer L1. In detail, the second layer L2 may be disposed to have a thickness of 0.1 μm to 1 μm.

The third layer L3 may be disposed on the second layer L2. The third layer L3 may include the same material as the second layer L2. For example, both the second layer L2 and the third layer L3 may include copper. That is, the third layer L3 may be a copper layer. In the wiring patterns 210 and 220, the second layer L2 and the third layer L3 including the same material may be distinguished from each other by a difference in the texture of each layer.

The third layer L3 may be formed through electrolytic plating using the second layer L2 as a seed layer. That is, the second layer L2 may be a seed layer for electrolytic plating of the third layer L3, and the third layer L3 may be a plating layer formed through the electrolytic plating. The third layer L3 may be disposed to have a thickness greater than that of the first layer L1 and the second layer L2. In detail, the third layer L3 may be disposed to have a thickness of 20 μm to 50 μm.

The fourth layer L4 may be disposed on the third layer L3. In detail, the fourth layer L4 may be disposed in contact with side surfaces and an upper surface of the third layer L3. In detail, the fourth layer L4 may be disposed while being spaced apart from the substrate 100 and in contact with the side surfaces and the upper surface of the third layer L3. That is, the fourth layer L4 may be disposed to be spaced apart from the substrate 100.

Since the fourth layer L4 is disposed to be spaced apart from the substrate 100, when the fourth layer L4 is formed by the plating process, a height of the circuit pattern may be increased more than the width thereof. Accordingly, it is possible to form more wiring patterns in the same area by minimizing the increase in width while securing a role as a coil by increasing a height of the coil member, thereby reducing the overall width of the coil member.

The fourth layer L4 may include the same material as the second layer L2 and the third layer L3. For example, the second layer L2, the third layer L3, and the fourth layer L4 may all include copper. That is, the fourth layer L4 may be a copper layer.

The fourth layer L4 may be a plating layer formed through the electrolytic plating. In detail, after the third layer L3 is formed, the fourth layer L4 may be formed by applying a current again through the plating line. The fourth layer L4 may be formed through one or more plating processes, and a plurality of layers having different textures may be formed on the fourth layer L4 according to the number of plating processes.

The fourth layer L4 may be disposed to have a thickness smaller than that of the third layer L3. In detail, the fourth layer L4 may be disposed to have a thickness of 5 μm to 15 μm.

Meanwhile, the wiring patterns 210 and 220 among the circuit patterns may further include a fifth layer. In detail, the fifth layer may be disposed on the pad portions 212*a* and 212*b* of the wiring pattern. The fifth layer may be disposed on the fourth layer L4. The fifth layer may be disposed on the pad portion to facilitate adhesion when the coil member and a terminal of the printed circuit board are connected.

The fifth layer may include a material the same as or different from those of the second to fourth layers. In detail, the fifth layer L5 may include tin (Sn). That is, the fifth layer may include a tin layer. Alternatively, the fifth layer may include both copper and tin. For example, a tin content may be increased while the fifth layer extends from the fourth layer L4 toward an upper surface of the fifth layer L5.

The fifth layer may have a thickness smaller than those of the second to fourth layers. In detail, the thickness of the fifth layer may be 0.3 μm to 0.8 μm.

Protective layers 510 and 520 may be respectively disposed on the wiring patterns 210 and 220, the plating patterns 310 and 320, and the dummy patterns 410 and 420. The protective layers 510 and 520 may be disposed to surround the wiring patterns 210 and 220, the plating patterns 310 and 320, and the dummy patterns 410 and 420. Accordingly, it is possible to inhibit oxidation of the wiring pattern by external moisture, air, and the like, and to inhibit film removal of the wiring pattern.

The protective layers 510 and 520 may be disposed to partially expose the wiring pattern. In detail, the protective layers 510 and 520 may be disposed on the wiring portion 211 and may not be disposed on the pad portions 212*a* and 212*b*. That is, the protective layers 510 and 520 may be disposed to expose the pad portions 212*a* and 212*b*. Accordingly, the wiring pattern disposed on the first surface 1S of the substrate 100, that is, a lower surface of the coil member, may be connected to the terminal of the printed circuit board of the camera module on which the coil member is disposed through the pad portions 212*a* and 212*b*. That is, the protective layers 510 and 520 may be formed on the entire surface on the second surface 2S of the substrate and may be all disposed in a region excluding the pad portions 212*a* and 212*b* of the wiring pattern on the first surface 1S.

The protective layers 510 and 520 may include a first protective layer 510 and a second protective layer 520. In detail, the protective layers 510 and 520 may include the first protective layer 510 disposed on the first surface 1S of the substrate 100 and the second protective layer 520 disposed on the second surface 2S of the substrate 100.

The first protective layer 510 and the second protective insect 520 may be disposed to have different thicknesses. For example, the first protective layer 510 may be disposed to have a thickness smaller than that of the second protective layer 520. That is, the first protective layer 510 disposed on one surface 1S of the substrate on which the pad portion of the wiring pattern is disposed may be disposed to have a thickness smaller than that of the second protective layer 520 in order to connect the pad portion and the terminal of the printed circuit board.

For example, the thickness of the protective layers 510 and 520 may be 10 μm to 40 μm, and the first protective layer 510 may be disposed to have a thickness smaller than that of the second protective layer 520 in the above range.

However, the embodiment is not limited thereto, the thickness of the first protective layer and the second protective layer may be formed to be the same as or similar by forming the thickness of the second protective layer 520 of the substrate to be small.

When the thickness of the protective layers 510 and 520 exceeds 40 μm, the thickness of the coil member may increase. When the thickness of the protective layers 510 and 520 is less than 10 μm, the reliability of the wiring pattern of the coil member may be deteriorated.

In addition, the protective layers 510 and 520 may be disposed inside the wiring patterns 210 and 220, the plating patterns 310 and 320, and the dummy patterns 410 and 420.

In detail, the protective layers 510 and 520 may also be disposed between the substrate 100 and the wiring patterns 210 and 220, the plating patterns 310 and 320, and the dummy patterns 410 and 420. In more detail, the protective layers 510 and 520 may also be disposed between the substrate 100 and the fourth layers L4 of the wiring patterns 210 and 220, the plating patterns 310 and 320, and the dummy patterns 410 and 420.

As described above, since the fourth layer L4 of the wiring patterns 210 and 220, the plating patterns 310 and 320, and the dummy patterns 410 and 420 are spaced apart from the substrate 100 and is disposed only on the side surface and the upper surface of the third layer L3, the protective layers 510 and 520 may be disposed in contact with the third layer L3 and the fourth layer L4 between the substrate 100 and the fourth layers L4 of the wiring patterns 210 and 220, the plating patterns 310 and 320, and the dummy patterns 410 and 420.

Accordingly, an area of the protective layers 510 and 520 may be improved, and the protective layers 510 and 520 may be disposed in a structure supported by the circuit pattern, that is, the fourth layer L4 to inhibit film removal of the protective layers 510 and 520.

The protective layers 510 and 520 may include an insulating material. The protective layers 510 and 520 may include various materials that may be cured by heating after being applied to protect a surface of the wiring pattern.

The protective layers 510 and 520 may be a resist layer. For example, the protective layers 510 and 520 may be a solder resist layer including an organic polymer material. As an example, the protective layers 510 and 520 may include an epoxy acrylate-based resin. In detail, the protective layers 510 and 520 may include a resin, a curing agent, a photoinitiator, a pigment, a solvent, a filler, an additive, an acryl-based monomer, and the like. However, the embodiment is not limited thereto, and the protective layers 510 and 520 may be any one of a photo-solder resist layer, a cover-lay, and a polymer material.

Meanwhile, the protective layers 510 and 520 may include different thicknesses and different colors for each region.

Figure 7:
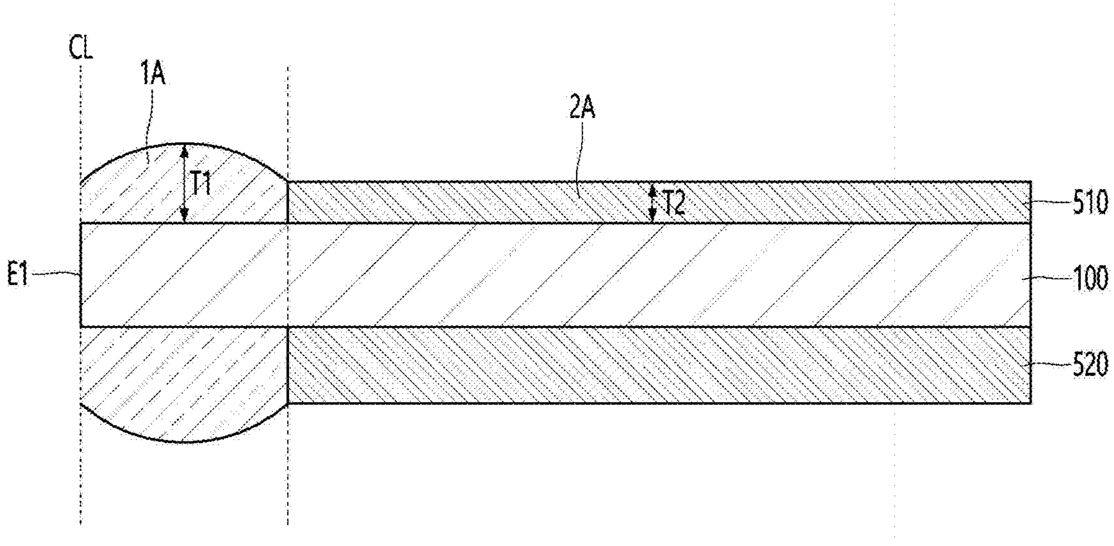
FIG. 7 is a cross-sectional view taken along line C-C' of FIG. 4.

FIG. 7 is a cross-sectional view taken along line C-C' of FIG. 4. That is, FIG. 7 is a cross-sectional view of a coil member on which a circuit pattern is not disposed.

Referring to FIG. 7, the protective layers 510 and 520 may include a first region 1A and a second region 2A. The first region 1A may be a region close to an end E1 of the substrate 100, and the second region 2A may be a region relatively farther from the end of the substrate 100 than the first region 1A. That is, the first region 1A may be a region close to the cutting line CL, and the second region 2A may be a region relatively farther from the cutting line CL than the first region 1A.

In the first region 1A and the second region 2A, the protective layers 510 and 520 may have different thicknesses. In detail, a maximum thickness T1 of the protective layers 510 and 520 in the first region may be greater than a maximum thickness T2 of the protective layers 510 and 520 in the second region. The first region 1A is a region close to the cutting line CL cut by a laser, and when the cutting line CL is cut through the laser, the protective layer on the cutting line CL may be deposited in the first region 1A while melting. Accordingly, the maximum thickness T1 of the protective layers 510 and 520 of the first region 1A close to the cutting line CL may be formed to be greater than the maximum thickness T2 of the protective layers 510 and 520 of the second region 2A.

Accordingly, since the first region 1A extending along a frame region of the coil member is thicker than the second region 2A that is an inner region of the coil member, it is possible to hold a frame of the coil member in the first region 1A. That is, since the frame of the coil member may be fixed in the first region 1A, a phenomenon in which an end of the coil member is bent may be minimized.

In addition, the protective layer of the first region 1A may have a thickness greater than a thickness of the protective layer of the second region 2A only on one surface of the substrate, or the protective layer of the first region 1A may have the thickness greater than the thickness of the protective layer of the second region 2A on both one surface and the other surface of the substrate.

In addition, the first region 1A and the second region 2A may have different colors. In detail, the first region 1A may be formed in a color darker than that of the second region 2A. For example, the first region 1A may be formed in a black-based color.

As described above, the first region 1A is the region close to the cutting line CL cut by the laser, and when the cutting line CL is cut through the laser, the color of the first region 1A may be different from that of the second region 2A while the first region 1A adjacent to the cutting line CL is burned.

Accordingly, by making the color of the first region 1A extending along the frame region of the coil member different from the color of the second region 2A which is the inner region of the coil member, when disposing the coil member on the printed circuit board of the camera module, the first region 1A may serve as a kind of alignment mark, thereby reducing an alignment tolerance.

The bridge portion B may be disposed to protrude from the cutting line CL. That is, the bridge portion B may be disposed to protrude from the end of the substrate 100. In detail, the bridge portion B may be disposed to protrude from the end of the substrate 100 while being integrally formed with the substrate 100.

The bridge portion B may include a first bridge portion B1 and a second bridge portion B2. The first bridge portion B1 and the second bridge portion B2 may be disposed to be spaced apart from each other. In detail, the first bridge portion B1 and the second bridge portion B2 may be respectively disposed at positions facing each other.

The bridge portions B1 and B2 may be formed to have a small length. For example, a length l of the bridge portions B1 and B2 may be smaller than a distance d defined as a maximum distance between the end E1 of the substrate 100 and the first wiring pattern disposed at the outermost of the first wiring patterns.

Accordingly, when the coil member is disposed on the printed circuit board of the camera module, it is possible to inhibit an arrangement position of the bridge portion from being limited.

Figure 8:
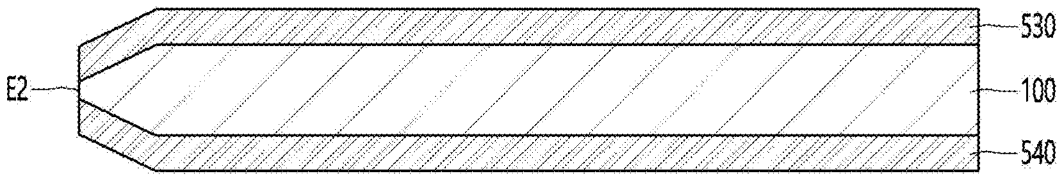
FIG. 8 is a cross-sectional view taken along line D-D' of FIG. 4.

FIG. 8 is a cross-sectional view taken along line D-D' of FIG. 4. That is, FIG. 8 is a cross-sectional view of the bridge portion.

Referring to FIG. 8, the bridge portions B1 and B2 may include shield layers 530 and 540. That is, the bridge portions B1 and B2 may be formed in a stacked structure of the substrate 100 and the shield layers 530 and 540 disposed on the first and second surfaces 1S and 2S of the substrate.

The shield layers 530 and 540 may include the same material as the protective layers 510 and 520. In addition, the shield layers 530 and 540 may be integrally formed with the protective layers 510 and 520. In addition, the shield layers 530 and 540 may be disposed to have a thickness the same as or similar to those of the protective layers 510 and 520.

Since the shield layers 530 and 540 are disposed on the bridge portions B1 and B2, it is possible to inhibit moisture or impurities from being penetrated into the coil member through the bridge portions B1 and B2.

In addition, since the shield layers 530 and 540 are disposed on the bridge portions B1 and B2, it is possible to inhibit a step from being generated between the bridge portion and the protective layer of a region adjacent to the bridge portion. Accordingly, when the coil member is disposed on the printed circuit board of the camera module and then the printed circuit board and other members are adhered to each other, it is possible to inhibit an adhesion failure due to the step.

The bridge portions B1 and B2 may include regions where the thickness becomes small. In detail, the bridge portions B1 and B2 may include a region where the thickness becomes smaller toward an end E2 of the bridge portions B1 and B2. That is, the bridge portions B1 and B2 may be narrowed in width while extending from a region adjacent to the end of the bridge portions B1 and B2 to the end.

Accordingly, it is possible to separate the coil members with less force and pressure than when the individual coil members are separated by applying force and pressure to the bridge portions B1 and B2.

The coil member according to the first embodiment may include a bridge portion. Accordingly, it is possible to easily cut the coil member through the bridge portion B. That is, the coil member may be easily cut by human force without a separate device or a separate post-treatment process.

Accordingly, it is possible to easily store and separate unit coil members from a coil member assembly disposed in plural on the large-area substrate. That is, the unit coil members may separate as many coil members as necessary, and remaining unit coil members may be stored while being fixed to the coil member assembly. Accordingly, it is possible to inhibit the separate post-treatment process from being required whenever the unit coil members are separated, thereby improving process efficiency.

In addition, since a plurality of unit coil members may be fixed and stored in one coil member assembly at once, thereby easily storing the coil member.

In addition, since the shield layers are disposed on both surfaces of the bridge portion, it is possible to inhibit external moisture or impurities from penetrating into the coil member through the bridge portion, thereby improving the reliability of the coil member.

In addition, since the shield layers are disposed on both surfaces of the bridge portion, it is possible to inhibit the formation of the step between the bridge portion and the protective layer of the region adjacent to the bridge portion, thereby inhibiting adhesion failure due to the step when the coil member is applied to the camera module.

Hereinafter, the coil member according to the second embodiment will be described with reference to FIGS. 9 to 14. In the description of the coil member according to the second embodiment, descriptions of the same as or similar to those of the coil member according to the above-described first embodiment will be omitted, and the same components will be designated by the same reference numerals.

Figure 9:
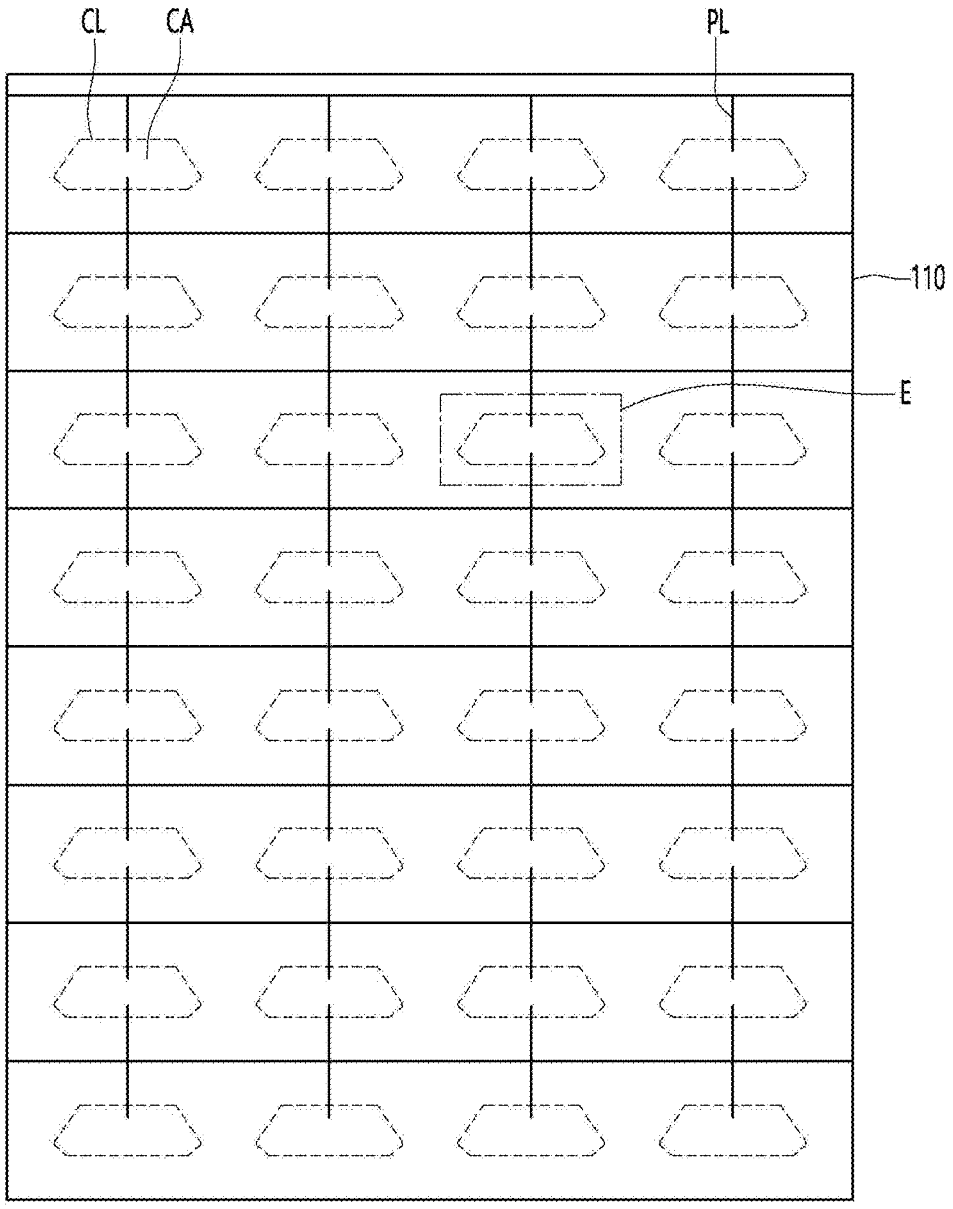
FIG. 9 is a view for describing a cutting process of a coil member according to a second embodiment.
Figure 10:
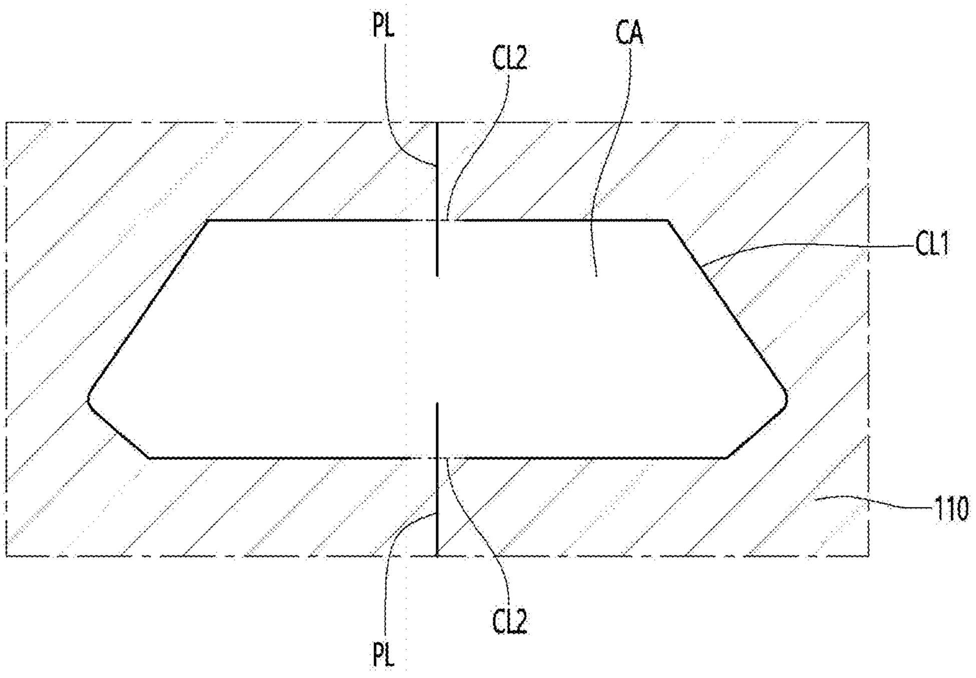
FIG. 10 is an enlarged view of region E in FIG. 9.
Figure 11:
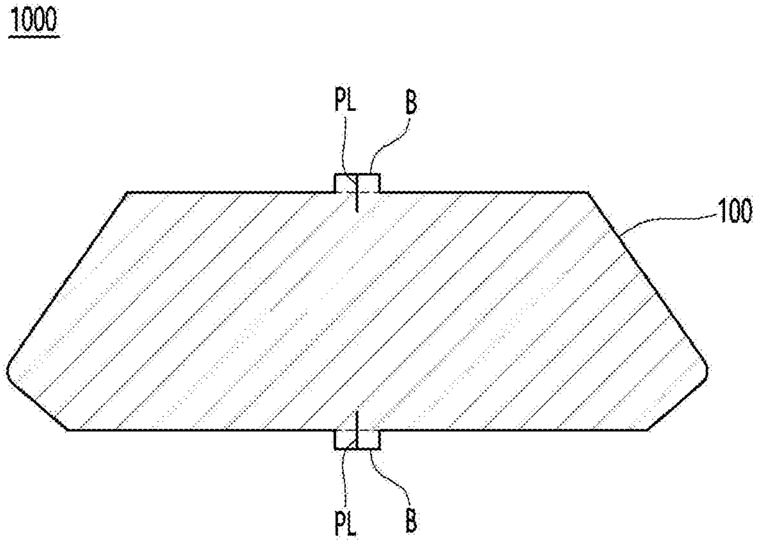
FIG. 11 is a view showing one coil member cut according to the cutting process of the coil member according to the second embodiment.

FIGS. 9 to 11 are views showing a manufacturing process of the coil member according to the embodiment and an outer shape of the coil member manufactured by the manufacturing process.

Referring to FIGS. 9 and 10, the cutting line CL may be partially cut. That is, the cutting lines CL may not be completely cut, and some regions may not be cut. Accordingly, the cutting line CL may include a first region defined as the cut region CL1 and a second region defined as the uncut region CL2.

The second region may be defined as a region where the substrate is not completely cut or the substrate is partially cut. Accordingly, the coil member region CA may be connected to the substrate without being separated from the substrate by the second region.

In this case, the second region may overlap a region where the plating line PL is disposed. That is, the cutting line CL may be cut in a region excluding the region where the plating line PL is disposed.

Accordingly, referring to FIG. 11, after the coil member is cut, the bridge portion B of the coil member may be disposed in a region overlapping the region where the plating line is disposed. That is, the bridge portion B may be disposed to support the plating line PL.

Therefore, when the coil member is cut, it is possible to inhibit a plating pattern of the coil member from protruding from the end of the substrate of the coil member.

In detail, when the coil member region is cut by the laser along the cutting line, in a region where the plating pattern is disposed on the substrate, an intensity or irradiation time of the laser may be greater than that of other regions in order to remove the plating pattern.

Accordingly, while the plating pattern is removed, the substrate in a peripheral region where the plating pattern is disposed may be removed together. In this case, the degree to which the substrate is removed may increase in proportion to the intensity and irradiation time of the laser. Accordingly, as the thickness of the plating pattern increases, the intensity and irradiation time of the laser increase, and accordingly, an area from which the substrate is removed in the region where the plating pattern is disposed may be increased. That is, the degree to which the substrate is removed during the process of cutting the plating pattern may be proportional to the thickness of the plating pattern.

Accordingly, when the coil member is cut, the substrate in the peripheral region where the plating pattern is disposed is removed together. After the coil member is cut, the plating pattern may be disposed to protrude from the end of the substrate. Accordingly, poor appearance and reliability of the coil member may occur due to corrosion of the protruding plating pattern, whereby defects may occur when the coil member is coupled to the printed circuit board.

Therefore, in the coil member according to the second embodiment, the plating pattern may be supported by the bridge portion B after cutting the coil member by disposing the bridge portion B at a position overlapping the plating line PL.

In addition, since a region of the bridge portion B where the plating line PL is disposed is cut by an external force or pressure rather than the laser, it is possible to inhibit the substrate in a region around the plating line PL from being removed together by the laser.

Therefore, the coil member according to the second embodiment may inhibit the plating pattern from protruding toward the end of the substrate 100 of the coil member. In addition, since the shield layer may be disposed on the plating pattern disposed on the bridge portion B, corrosion or damage to the plating pattern by external moisture or impurities may be inhibited.

Accordingly, the coil member according to the second embodiment may have improved reliability.

Hereinafter, the coil member according to the second embodiment will be described in more detail with reference to FIGS. 12 to 14.

Figure 12:
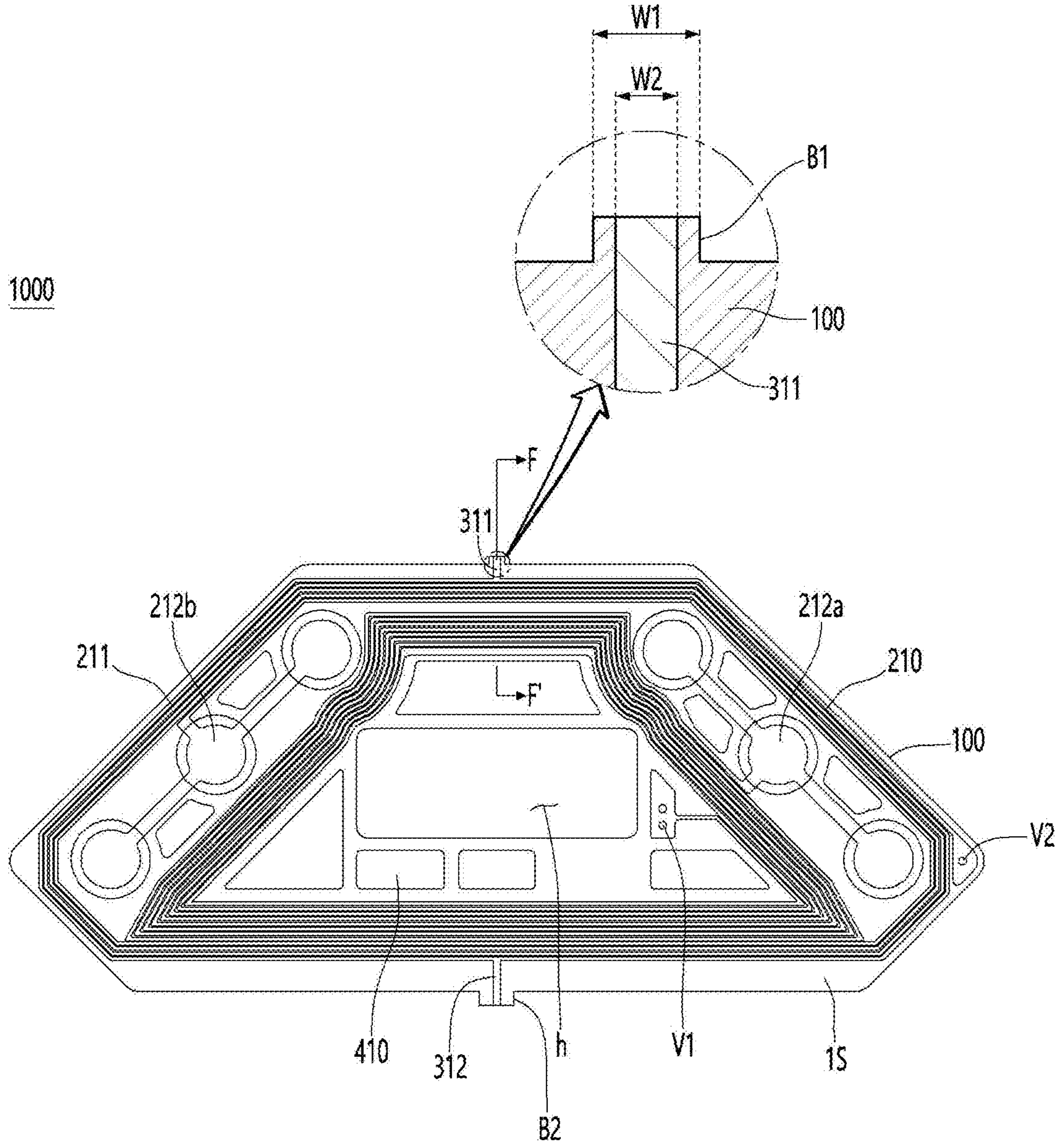
FIG. 12 is a bottom view of the coil member according to the second embodiment.
Figure 13:
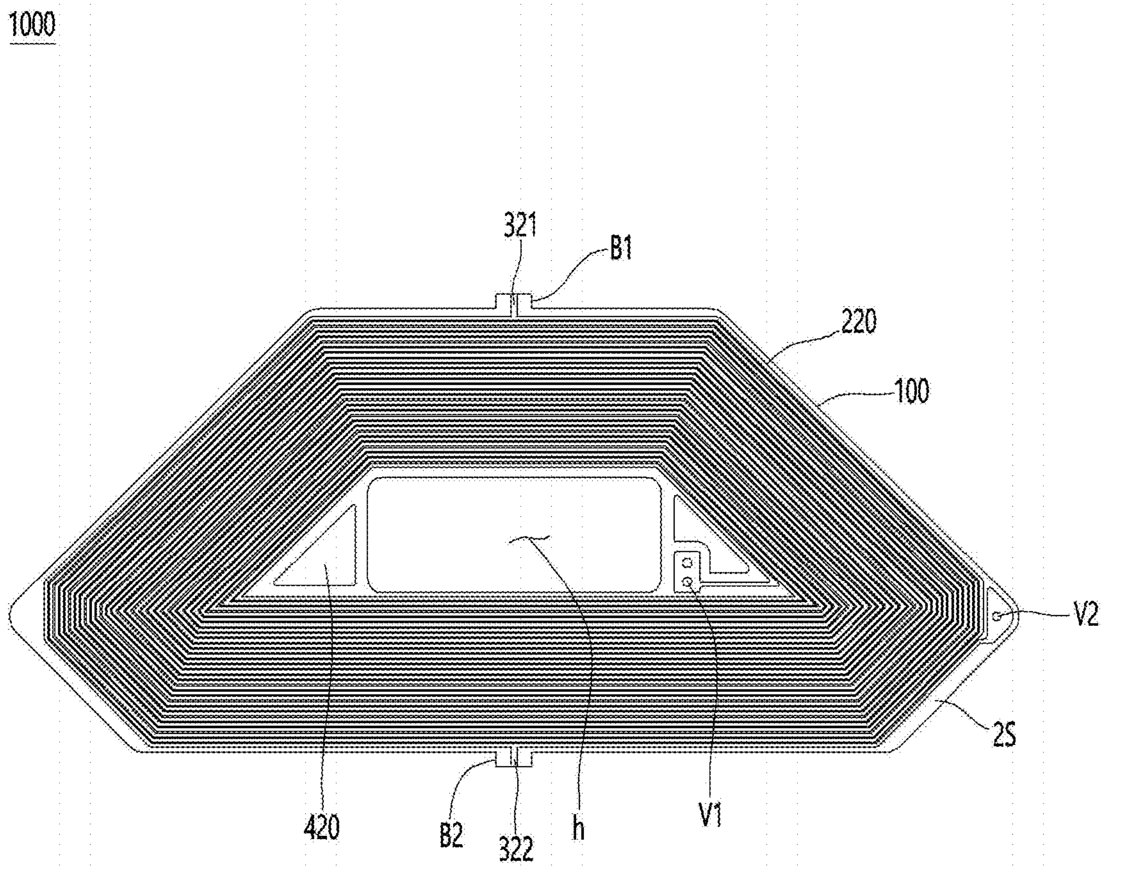
FIG. 13 is a top view of the coil member according to the second embodiment.
Figure 14:
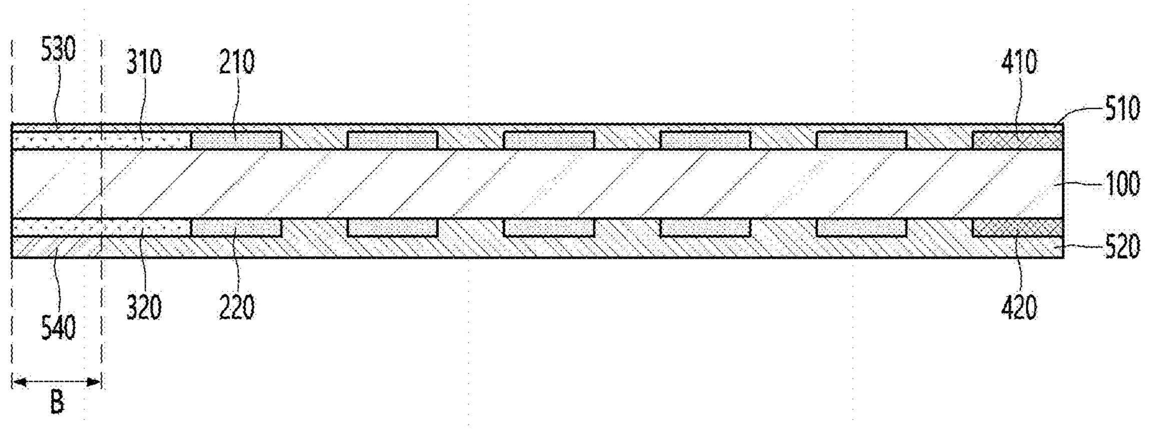
FIG. 14 is a cross-sectional view taken along line F-F' of FIG. 12.

Referring to FIGS. 12 to 14, the coil member according to the second embodiment may include a first bridge portion B1 and a second bridge portion B2.

The first bridge portion B1 may be disposed at a position overlapping the first-first plating pattern 311 and the second-first plating pattern 321, and the second bridge portion B2 may be disposed at a position overlapping the first-second plating pattern 312 and the second-second plating pattern 322.

Accordingly, the first-first plating pattern 311 and the second-first plating pattern 321 may be supported by the bridge portion B1. In addition, the first-second plating pattern 312 and the second-second plating pattern 322 may be supported by the second bridge portion B2.

A width W1 of the bridge portions B1 and B2 may be greater than or equal to a width W2 of the plating pattern. That is, the width of the bridge portions B1 and B2 may be equal to or greater than the width of the plating pattern.

In addition, an end of the plating pattern may be the same as an end of the bridge portion, or the end of the plating pattern may be disposed inside the end of the bridge portion. That is, the plating pattern may be disposed so as not to protrude from the bridge portion.

Accordingly, the bridge portions B1 and B2 may be disposed to support all regions of the plating pattern.

FIG. 14 is a cross-sectional view taken along line F-F' of FIG. 12. That is, FIG. 14 is a cross-sectional view of the bridge portion.

Referring to FIG. 14, the bridge portion B may include the substrate 100, the first plating pattern 310 disposed on the first surface 1S of the substrate 100, and the second plating pattern 320 disposed the second surface 2S of the substrate 100. In addition, a first shield layer 530 and a second shield layer 540 may be disposed on the first plating pattern 310 and the second plating pattern 320 of the bridge portion B, respectively. That is, the bridge portion B may be formed in a stacked structure of the substrate, the plating pattern, and the shield layer. That is, in the plating patterns 310 and 320, all regions disposed on the bridge portion B and the substrate 100 may be surrounded by the protective layers 510 and 520 and the shield layers 530 and 540.

Accordingly, the plating patterns 310 and 320 disposed on the bridge portions B1 and B2 may be protected from external moisture or impurities.

In addition, since the shield layers 530 and 540 are disposed on the bridge portions B1 and B2, it is possible to inhibit the step from being generated between the bridge portion and the protective layer in the region adjacent to the bridge portion. Accordingly, when the coil member is disposed on the printed circuit board of the camera module and then the printed circuit board and other members are adhered to each other, adhesion failure due to the step may be inhibited.

The coil member according to the second embodiment may include the bridge portion. In detail, the bridge portion may be disposed at the position overlapping the region where the plating pattern is disposed. Accordingly, it is possible to easily cut the coil member through the bridge portion B. That is, the coil member may be easily cut by human force without a separate device or a separate post-treatment process.

Accordingly, it is possible to easily store and separate the unit coil members from the coil member assembly disposed in plural on the large-area substrate. That is, the unit coil members may separate as many coil members as necessary, and the remaining unit coil members may be stored while being fixed to the coil member assembly. Accordingly, it is possible to inhibit the separate post-treatment process from being required whenever the unit coil members are separated, thereby improving process efficiency.

In addition, since the plurality of unit coil members may be fixed and stored in one coil member assembly at once, thereby easily storing the coil members.

In addition, since the bridge portion is disposed at a position overlapping the plating line, that is, the plating pattern, a process of irradiating the laser to the region where the plating pattern is disposed is not required when the unit coil member is separated.

Accordingly, when the region where the plating pattern is disposed is cut, the substrate around the plating pattern may be removed together to inhibit the plating pattern from being disposed to protrude from the end of the substrate.

In addition, since the shield layer may be disposed on the plating pattern disposed on the bridge portion, corrosion of the plating pattern may be effectively inhibited by the shield layer, thereby improving the reliability of the coil member.

In addition, since the shield layers are disposed on both surfaces of the bridge portion, it is possible to inhibit the formation of the step in the bridge portion and the region adjacent to the bridge portion, thereby inhibiting adhesion failure due to the step when the coil member is applied to the camera module.

Hereinafter, a coil member according to a third embodiment will be described with reference to FIGS. 15 to 23. In the description of the coil member according to the third embodiment, descriptions of the same as or similar to those of the coil member according to the above-described embodiments will be omitted, and the same components will be designated by the same reference numerals.

In the coil member according to the third embodiment, the circuit patterns may be formed in different sizes and spaced apart from each other at different intervals. In detail, the circuit patterns may be formed to have different widths, thicknesses, and areas, and the circuit patterns may include regions having different intervals.

That is, an interval between adjacent circuit patterns among the circuit patterns according to the third embodiment may vary according to the widths of the circuit patterns. In detail, in the coil member according to the embodiment, the interval between adjacent circuit patterns may increase as the width of the circuit patterns increases. That is, in the coil member according to the embodiment, the interval between adjacent circuit patterns may be proportional to a size of the width of the circuit patterns.

The interval between circuit patterns will be described in detail with reference to FIGS. 15 to 23.

Figure 15:
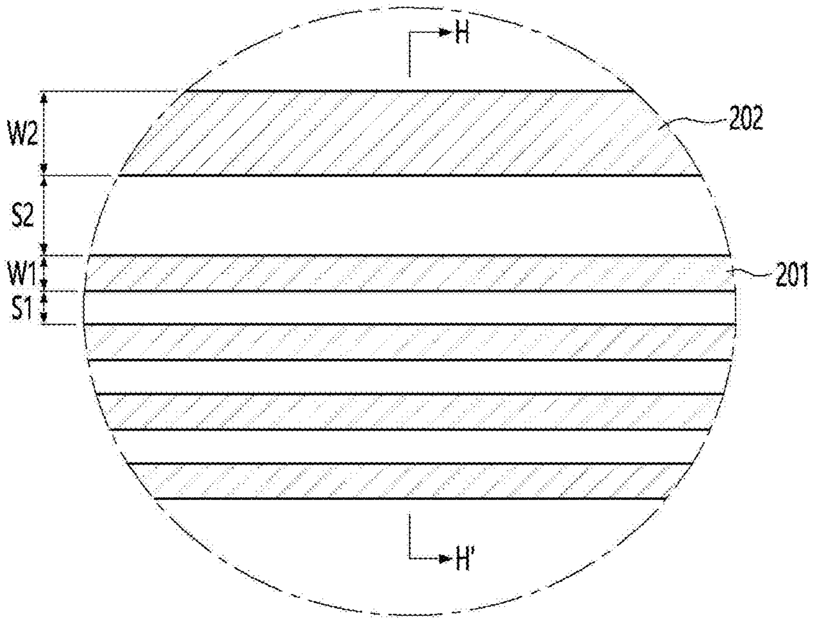
FIG. 15 is an enlarged view of region Gin FIG. 1.

FIG. 15 is an enlarged view of a region G of FIG. 1. That is, FIG. 15 is an enlarged view of one region of the first wiring pattern 210 in FIG. 1. Hereinafter, the first wiring pattern 210 will be mainly described, but the following description may be equally applied to the second wiring pattern 220.

Referring to FIG. 15, the first wiring patterns 210 may be disposed to be spaced apart from each other. In detail, since one wiring pattern is disposed in a coil shape in the first wiring pattern 210, the first wiring pattern 210 may include a spaced region for forming the coil shape.

Referring to FIG. 15, the first wiring pattern may include a first-first wiring pattern 201 and a first-second wiring pattern 202 disposed to be spaced apart from each other. Although the first-first wiring pattern 201 and the first-second wiring pattern 202 are connected to each other on the substrate 100, since the first wiring pattern as a whole is disposed in the coil shape, the first-first wiring pattern 201 and the first-second wiring pattern 202 may be spaced apart from each other.

The first-first wiring pattern 201 and the first-second wiring pattern 202 may have different sizes. In detail, the first-first wiring pattern 201 and the first-second wiring pattern 202 may be formed to have different widths. For example, the first-first wiring pattern 201 may have a first width w1, the first-second wiring pattern 202 may have a second width w2, and the first width w1 may be smaller than the second width w2.

The first wiring pattern 210 may include a region having the first width w1 and a region having the second width w2. That is, the width of the first wiring pattern 210 may be varied while extending in a coil direction. Although only the first width w1 and the second width w2 are illustrated in FIG. 15, the embodiment is not limited thereto, and the first wiring pattern 210 may be changed to various sizes while extending in the coil direction.

Since the first wiring pattern 210 has a width of various sizes and extends in the coil direction, the first wiring pattern 210 may have various intervals according to the sizes of the patterns.

In detail, the first wiring pattern 210 may have a first interval s1 and a second interval s2. In detail, the first wiring pattern 210 may have the first interval s1 between the first-first wiring patterns 201 having the first width w1 and the second interval s2 between the 1-1 wiring pattern 201 having the first width w1 and the first-second wiring pattern 202 having the second width w2.

In this case, the sizes of the first interval s1 and the second interval s2 may be different. In detail, the size of the first interval s1 may be smaller than the size of the second interval s2. That is, an interval between wiring patterns having different widths may be greater than an interval between wiring patterns having the same width.

Accordingly, it is possible to inhibit the wiring patterns spaced apart from each other from being connected in contact with each other to inhibit a short circuit between the wiring patterns.

The first interval s1 and the second interval s2 of the first wiring pattern 210 may be related to a layer structure of the first wiring pattern 210.

Figure 16:
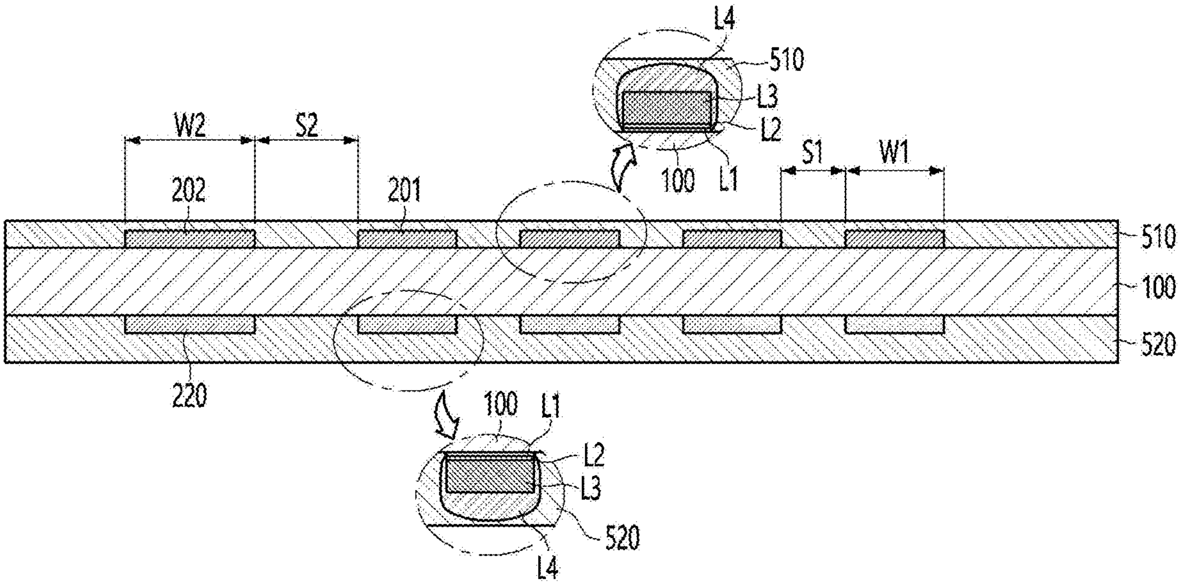
FIG. 16 is a cross-sectional view taken along line H-H' of FIG. 15.

FIG. 16 is a cross-sectional view taken along line H-H' of FIG. 15, and FIGS. 17 to 19 are views for describing a manufacturing process of the first wiring pattern 210.

Referring to FIG. 16, the first wiring pattern 210 may include a plurality of layers. In detail, the first wiring pattern 210 may include a plurality of conductive layers. For example, the first wiring pattern 210 may include a first layer L1, a second layer L2, a third layer L3, and a fourth layer L4 that are disposed to be sequentially stacked on the substrate 100. In FIG. 4, the first wiring pattern 210 has been mainly described, but the embodiment is not limited thereto, and the second wiring pattern 220, the plating pattern, and the dummy pattern may also include the first layer L1, the second layer L2, the third layer L3, and the fourth layer L4 in the same manner as the layer structure of the first wiring pattern 210.

The first layer L1 may be disposed on the substrate 100. In detail, the first layer L1 may be disposed in direct contact with the substrate 100.

The first layer L1 may be formed in multiple layers. For example, the first layer L1 may include at least one of nickel, chromium, and titanium. That is, the first layer L1 may include at least one of a nickel layer, a chromium layer, and a titanium layer. For example, the first layer L1 may include the nickel layer and the chromium layer on the nickel layer.

The first layer L1 may be formed through an electroless plating or sputtering process. The first layer L1 may be disposed to have a thin thickness of a thin film. In detail, the first layer L1 may be disposed to have a thickness of 20 nm or less.

The first layer L1 may be a layer that improves adhesion between the second layer L2 disposed on the first layer L1 and the substrate 100. For example, the nickel layer may have good adhesion to the substrate 100, and the chromium layer may have good adhesion to the nickel layer and the second layer L2. Accordingly, the adhesion of the second layer L2 disposed on the substrate 100 may be improved.

The second layer L2 may be disposed on the first layer L1. The second layer L2 may include a material the same as or different from that of the first layer L1. Specifically, the second layer L2 may include a metal material having excellent conductivity. For example, the second layer L2 may include a metal layer including at least one of copper (Cu), aluminum (Al), chromium (Cr), nickel (Ni), silver (Ag), or molybdenum (Mo), gold (Au), titanium (Ti), and alloys thereof. Preferably, the second layer L2 may include copper. That is, the second layer L2 may be a copper layer.

The second layer L2 may be formed through the electroless plating. The second layer L2 may be disposed to have a thickness greater than that of the first layer L1. In detail, the second layer L2 may be disposed to have a thickness of 0.1 μm to 1 μm.

The third layer L3 may be disposed on the second layer L2. The third layer L3 may include the same material as the second layer L2. For example, both the second layer L2 and the third layer L3 may include copper. That is, the third layer L3 may be a copper layer. In the wiring patterns 210 and 220, the second layer L2 and the third layer L3 including the same material may be distinguished from each other by a difference in the texture of each layer.

The third layer L3 may be formed through electrolytic plating using the second layer L2 as a seed layer. That is, the second layer L2 may be a seed layer for electrolytic plating of the third layer L3, and the third layer L3 may be a plating layer formed through the electrolytic plating. The third layer L3 may be disposed to have a thickness greater than that of the first layer L1 and the second layer L2. In detail, the third layer L3 may be disposed to have a thickness of 20 μm to 50 μm.

The fourth layer L4 may be disposed on the third layer L3. In detail, the fourth layer L4 may be disposed in contact with the side surfaces and an upper surface of the third layer L3. In detail, the fourth layer L4 may be disposed to be spaced apart from the substrate 100 and in contact with the side surfaces and the upper surface of the third layer L3. That is, the fourth layer L4 may be disposed to be spaced apart from the substrate 100.

Accordingly, the above-described protective layers 510 and 520 may also be disposed inside the wiring patterns 210 and 220, the plating patterns 310 and 320, and the dummy patterns 410 and 420. In detail, the protective layers 510 and 520 may also be disposed between the substrate 100 and the wiring patterns 210 and 220, the plating patterns 310 and 320, and the dummy patterns 410 and 420. In more detail, the protective layers 510 and 520 may also be disposed between the substrate 100 and the fourth layers L4 of the wiring patterns 210 and 220, the plating patterns 310 and 320, and the dummy patterns 410 and 420.

Since the fourth layer L4 of the wiring patterns 210 and 220, the plating patterns 310 and 320, and the dummy patterns 410 and 420 is spaced apart from the substrate 100 and is disposed only on the side surface and upper surface of the third layer L3, the protective layers 510 and 520 may also be disposed in contact with the third layer L3 and the fourth layer L4 between the substrate 100 and the fourth layers L4 of the wiring patterns 210 and 220, the plating patterns 310 and 320, and the dummy patterns 410 and 420.

Accordingly, the area of the protective layers 510 and 520 may be increased, and the protective layers 510 and 520 are disposed in a structure supported by the circuit pattern, that is, the fourth layer L4, thereby inhibiting film removal of the protective layers 510 and 520.

The fourth layer L4 may include the same material as the second layer L2 and the third layer L3. For example, the second layer L2, the third layer L3, and the fourth layer L4 may all include copper. That is, the fourth layer L4 may be a copper layer.

The fourth layer L4 may be a plating layer formed through the electrolytic plating. In detail, after the third layer L3 is formed, the fourth layer L4 may be formed by applying a current again through the plating line. The fourth layer L4 may be formed through one or more plating processes, and a plurality of layers having different textures may be formed in the fourth layer L4 depending on the number of plating processes.

The fourth layer L4 may be disposed to have a thickness smaller than that of the third layer L3. In detail, the fourth layer L4 may be disposed to have a thickness of 5 μm to 15 μm.

Meanwhile, the wiring patterns 210 and 220 among the circuit patterns may further include a fifth layer. In detail, the fifth layer may be disposed on the pad portions 212*a* and 212*b* of the wiring pattern. The fifth layer may be disposed on the fourth layer L4. The fifth layer may be disposed on the pad portion to facilitate adhesion when the coil member and a terminal of the printed circuit board are connected.

The fifth layer may include a material the same as or different from those of the second to fourth layers. In detail, the fifth layer may include tin (Sn). That is, the fifth layer may include a tin layer. Alternatively, the fifth layer may include both copper and tin. For example, a tin content may be increased while the fifth layer extends from the fourth layer L4 toward an upper surface of the fifth layer.

The fifth layer may have a thickness smaller than those of the second to fourth layers. In detail, the thickness of the fifth layer may be 0.3 μm to 0.8 μm.

Among the layer structures of the first wiring pattern 210, the third layer L3 and the fourth layer L4 may be formed through electrolytic plating. That is, the third layer L3 and the fourth layer L4 may be plating layers.

In this case, a thickness and a width of the first wiring patterns 210 are both increased through the plating process, and accordingly, adjacent first wiring patterns 210 may be connected to each other and short-circuited during the plating process.

In detail, the first-first wiring pattern 201 and the first-second wiring pattern 202 may have different widths and thicknesses. That is, since the first-first wiring pattern 201 and the first-second wiring pattern 202 have different widths, the thickness of the wiring pattern may also be changed according to a difference in the width of the wiring pattern when the fourth layer L4 is formed by the plating process.

That is, since a width of the third layer L3 of the first-second wiring pattern 202 is greater than a width of the third layer of the first-first wiring pattern 201, the fourth layer on the first-second wiring pattern 202 may be formed to have a width and thickness greater than those of the fourth layer on the first-first wiring pattern 201.

Therefore, in a region where the patterns having different widths are adjacent to each other, when the fourth layer is formed, the adjacent patterns may be short-circuited due to a difference in size of the plating layer.

Accordingly, the coil member according to the embodiment may inhibit a short-circuit caused by making the interval between the patterns having different widths greater than the interval between the patterns having the same or similar width.

Figure 17:
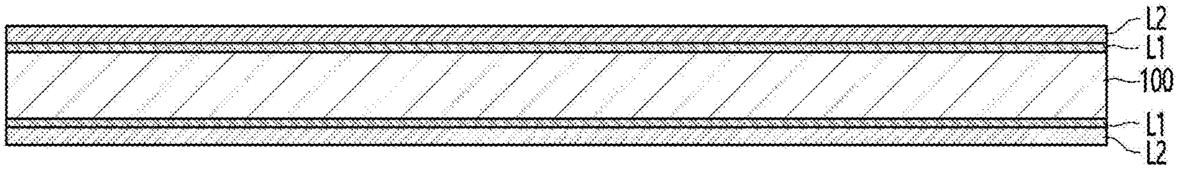
FIGS. 17 to 19 are cross-sectional views for describing a manufacturing process of a circuit pattern of a coil member according to an embodiment.
Figure 18:
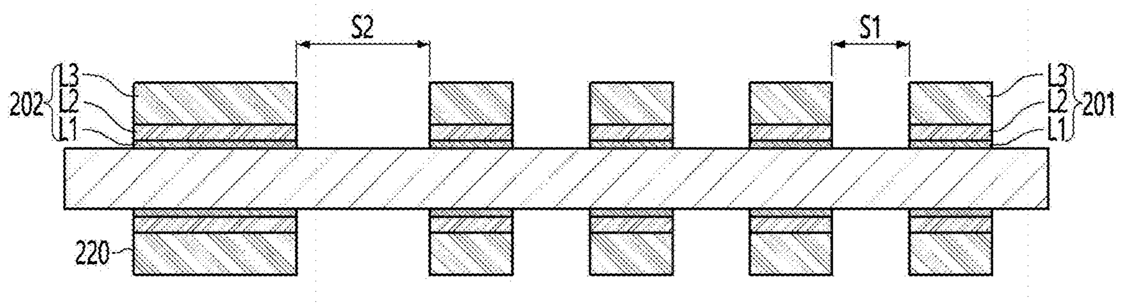
Figure 19:
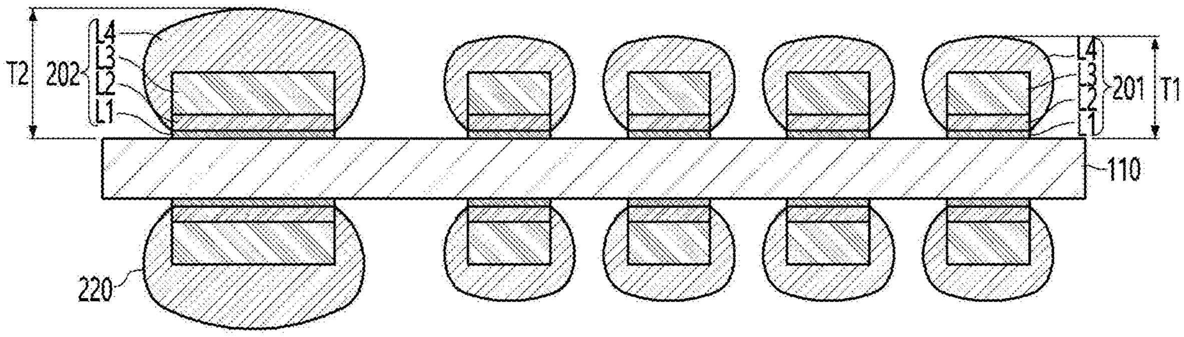

FIGS. 17 to 19 are views for describing a manufacturing process of the first wiring pattern.

Referring to FIG. 17, the first layer L1 and the second layer L2 may be disposed on the substrate 100. The first layer L1 and the second layer L2 may be disposed on the entire surface of the substrate 100 by the plating and sputtering process.

Subsequently, referring to FIG. 18, the third layer L3 may be formed on the substrate 100. In detail, the third layer L3 may be disposed on the second layer L2. The third layer L3 may be formed through electrolytic plating. In detail, the third layer L3 may be formed as a plating layer in which current is transmitted through the plating pattern and the second layer L2 is used as a seed layer.

After the third layer L3 is formed, the third layer L3 may be formed in a coil pattern shape through processes of exposure, development, and flash etching (removing the second layer). That is, the first wiring pattern 210 may be formed the coil pattern shape having the first-first wiring pattern 201 having the first width w1 and the first-second wiring pattern 202 having the second width w2.

In detail, the first wiring pattern 210 disposed in the coil shape may include one or at least two or more regions having different widths depending on a position of the first wiring pattern and a direction of the first wiring pattern.

In this case, the first wiring patterns 210 may be formed to have different intervals depending on the widths of the wiring patterns. In detail, the first wiring pattern 210 may have the first interval s1 between the first-first wiring patterns 201 and the second interval s2 between the first-first wiring pattern 201 and the first-second wiring patterns 202. The second interval s2 may be greater than the first interval s1.

Accordingly, it is possible to inhibit a short-circuit from occurring in the first-first pattern 201 and first-second wiring pattern 202 by a difference in the widths of the plating layers of the first-first wiring pattern 201 and the first-second wiring pattern 202 when the fourth layer L4 to be described below is formed.

In detail, referring to FIG. 19, the fourth layer L4 may be formed on the third layer L3. In detail, the fourth layer L4 may be disposed to surround the third layer L3. The fourth layer L4 may be formed by the same process as the third layer L3. That is, the fourth layer L4 may be formed through electrolytic plating.

The fourth layer L4 may be formed to have a different width depending on a width of the first wiring pattern. In detail, since the first-first wiring pattern 201 and the first-second wiring pattern 202 have different widths, a width of the fourth layer L4 which is a plating layer formed by electrolytic plating may also be different. That is, since the first-second wiring pattern 202 has a width greater than that of the first-first wiring pattern 201, an amount of current applied through the plating pattern is large, so that a plating layer having a width greater than that of the first-first wiring pattern 201 may be formed.

That is, since the fourth layer of the first-second wiring pattern 202 is formed of a plating layer greater than the fourth layer of the first-first wiring pattern 201, the width and thickness of the wiring pattern may be greater.

That is, the first-first wiring pattern 201 may have the first width w1 and a first thickness T1, and the first-second wiring pattern 202 may have the second width w2 greater than the first width w1 and a second thickness T2 greater than the first thickness T1.

Accordingly, when the first interval s1 and the second interval s2 are formed to be the same, adjacent wiring patterns are connected to each other by forming the plating layer having different sizes in the second interval s2 between patterns having different widths is formed, thereby occurring a short-circuit.

Therefore, the second interval s2 is formed to be greater than the first interval s1, so that when the fourth layer L4 is formed, it is possible to inhibit the adjacent wiring patterns having different widths from being short-circuited.

Accordingly, the coil member according to the embodiment may inhibit a short-circuit of patterns due to a difference in size of the plating layer in patterns having different line widths when forming the circuit pattern. Therefore, the coil member according to the embodiment may inhibit the short-circuit of circuit patterns to improve electrical characteristics and reliability of the coil member.

Figure 20:
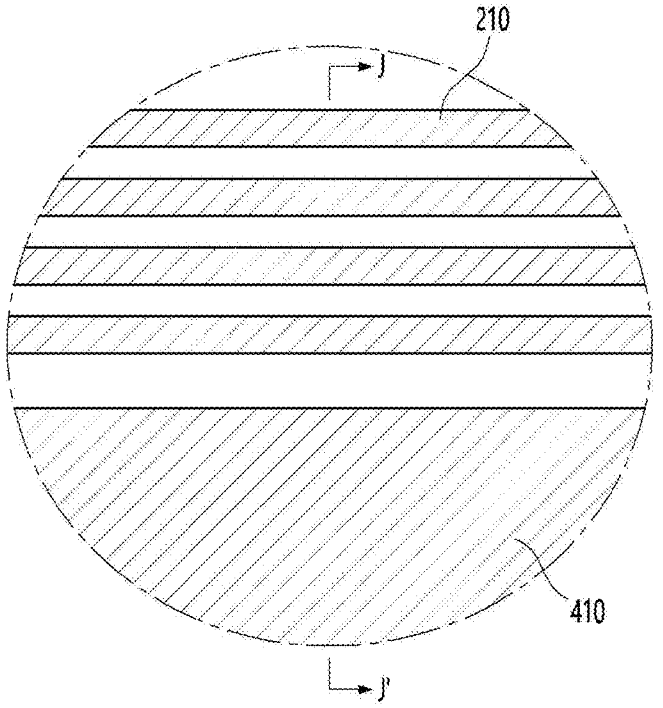
FIG. 20 is an enlarged view of region I in FIG. 1.

FIG. 20 is an enlarged view of region I of FIG. 1. That is, FIG. 20 is an enlarged view of a region where the first wiring pattern 210 and the first dummy pattern 410 are adjacent to each other in FIG. 1. Hereinafter, the first wiring pattern 210 and the first dummy pattern 410 will be mainly described, but the following description may be equally applied to the second wiring pattern 220 and the second dummy pattern 420.

Referring to FIG. 20, the first wiring pattern 210 and the first dummy pattern 410 may be disposed to be spaced apart from each other. That is, the first wiring pattern 210 and the first dummy pattern 410 may be physically spaced apart from each other so as not to be electrically connected to each other.

The first wiring pattern 210 and the first dummy pattern 410 may be disposed in different shapes. The first wiring pattern 210 and the first dummy pattern 410 may be disposed in different sizes. That is, the first wiring pattern 210 and the first dummy pattern 410 may have different widths and thicknesses.

Figure 21:
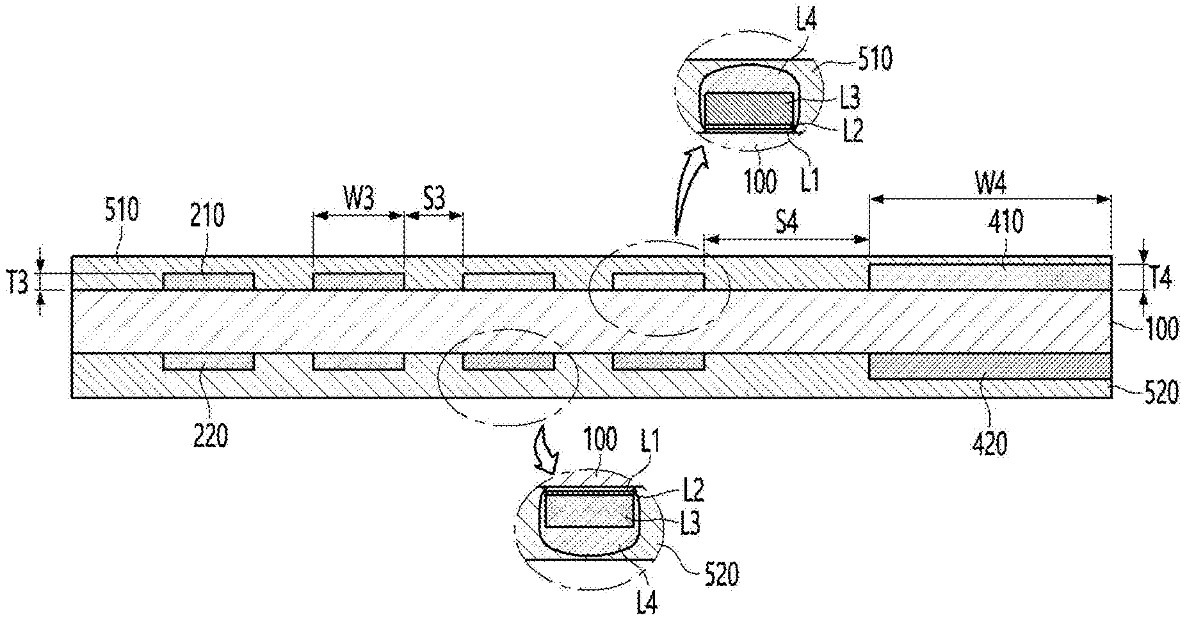
FIG. 21 is a cross-sectional view taken along line J-J' of FIG. 20.

Referring to FIG. 21, the first wiring pattern 210 may have a third width w3, and the first dummy pattern 410 may have a fourth width w4. The third width w3 and the fourth width w4 may be different from each other. In detail, the third width w3 may be smaller than the fourth width w4. That is, the width of the first dummy pattern 410 may be greater than the width of the first wiring pattern.

In addition, the first wiring pattern 210 may have a third thickness T3, and the first dummy pattern 410 may have a fourth thickness T4. The third thickness T3 and the fourth thickness T4 may be different from each other. In detail, the third thickness T3 may be smaller than the fourth thickness T4. That is, the thickness of the first dummy pattern 410 may be greater than the thickness of the first wiring pattern.

In addition, an interval s3 between the first wiring patterns 210 and an interval s4 between the first wiring pattern 210 and the first dummy pattern 410 may be different from each other. In detail, the third interval s3 may be smaller than the fourth interval s4. That is, the interval between the first wiring pattern 210 and the first dummy pattern 410 may be greater than the interval between the first wiring patterns 210.

Accordingly, the coil member according to the third embodiment may inhibit the short-circuit of patterns due to a difference in size of plating layers in patterns having different line widths when forming the wiring pattern and the dummy pattern. Therefore, the coil member according to the embodiment may inhibit a short-circuit between the wiring pattern and the dummy pattern to improve the electrical characteristics and reliability of the coil member.

Meanwhile, the fourth interval s4 may be greater than the second interval s2. In addition, the first interval s1 and the third interval s3 may be the same or similar.

That is, since the width of the first dummy pattern 410 is greater than the width of the first wiring pattern 210, the plating layer of the first dummy pattern 410 formed by the fourth layer L4 may be greater than the plating layer of the first wiring pattern.

Accordingly, the interval between adjacent patterns may vary depending on the width of the circuit pattern. That is, as the width of the circuit pattern increases, the interval between the adjacent patterns also increases, so that the fourth interval s4 is formed to be greater than the third interval S3, and accordingly, it is possible to inhibit a short-circuit between the adjacent circuit patterns.

Figure 22:
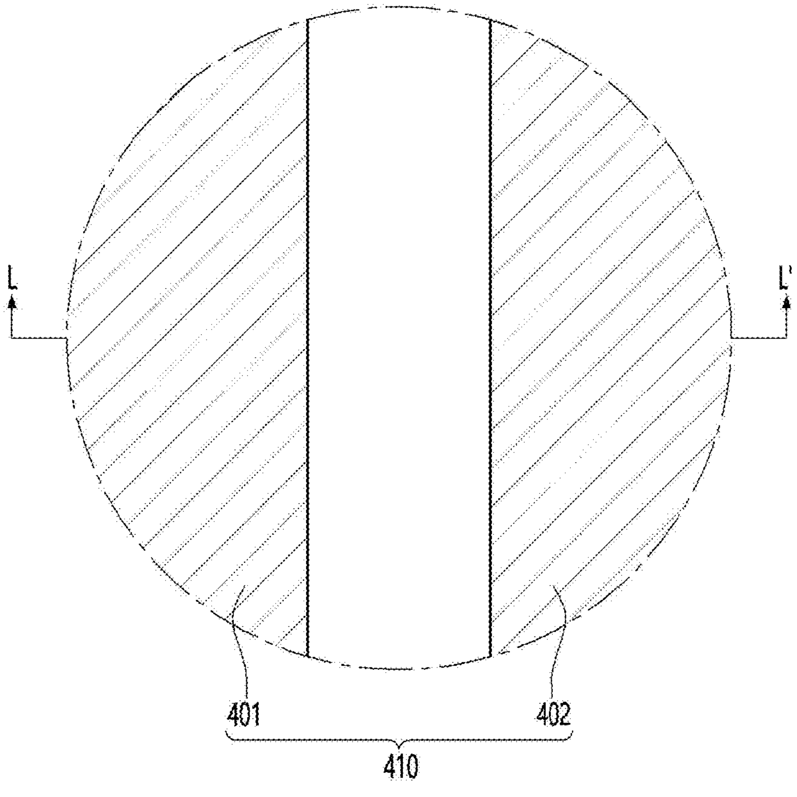
FIG. 22 is an enlarged view of region K in FIG. 1.
Figure 23:
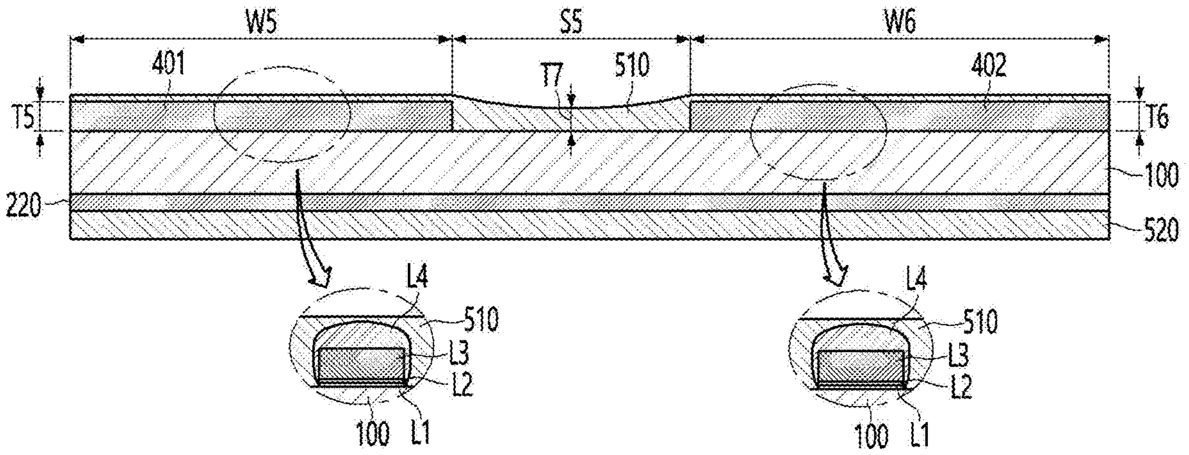
FIG. 23 is a cross-sectional view taken along line L-L' of FIG. 22.

FIG. 22 is an enlarged view of a region K of FIG. 1, and FIG. 23 is a cross-sectional view taken along line L-L' of FIG. 22. That is, FIG. 22 is an enlarged view of a region where the first dummy patterns 410 are adjacent to each other in FIG. 1. Hereinafter, the first dummy pattern 410 will be mainly described, but the following description may be equally applied to the second dummy pattern 420.

Referring to FIGS. 22 and 23, adjacent first dummy patterns 410 may be disposed to be spaced apart from each other. Since the first dummy patterns 410 are appropriately spaced apart from each other, thereby improving thickness uniformity of other circuit patterns adjacent to the first dummy pattern 410.

Accordingly, the first dummy pattern 410 may include a first-first dummy pattern 401 and a first-second dummy pattern 402 spaced apart from each other.

The first-first dummy pattern 401 may have a fifth width w5, and the first-second dummy pattern 402 may have a sixth width w6. In addition, the first-first dummy pattern 401 may have a fifth thickness T5, and the first-second dummy pattern 402 may have a sixth thickness T6.

Meanwhile, the first protective 510 is disposed on the first-first dummy pattern 401 and the first-second dummy pattern 402, and in this case, the first protective layer 510 may include regions having different thicknesses. In detail, a thickness T7 of the first protective layer 510 between the first-first dummy pattern 401 and the first-second dummy pattern 402 in which the dummy pattern is not disposed may be smaller than that of the protective layer 510 in other regions. Accordingly, the first protective layer 510 between the first-first dummy pattern 401 and the first-second dummy pattern 402 may be formed in a concave shape.

The fifth width w5 and the sixth width w6 may be greater than at least one of the first width w1 to the third width w3. In addition, the fifth thickness T5 and the sixth thickness T6 may be greater than at least one of the first thickness T1 to the third thickness T3.

In addition, the first-first dummy pattern 401 and the first-second dummy pattern 402 may be spaced apart from each other at a fifth interval s5.

The fifth interval s5 may be greater than at least one of the first interval s1, the second interval s2, the third interval s3, and the fourth interval s4.

That is, an interval between the dummy patterns having a width greater than that of the first wiring pattern 210 may be greater than an interval between other circuit patterns.

Accordingly, the coil member according to the embodiment may inhibit a short-circuit of dummy patterns due to a difference in size of plating layers formed on the dummy patterns when forming a plurality of dummy patterns. In detail, since the dummy patterns have a greater width than other circuit patterns, a width and thickness of the fourth layer may be greater than those of the other circuit patterns.

Accordingly, by forming the fifth interval between the dummy patterns to be greater than other intervals, it is possible to inhibit a short circuit of adjacent dummy patterns when forming the dummy patterns.

Therefore, the coil member according to the embodiment may inhibit the short circuit between the dummy patterns, thereby further improving the thickness uniformity of the circuit pattern of the coil member.

The coil member according to the third embodiment may have different intervals depending on widths of the wiring pattern, the dummy pattern, and the plating pattern.

That is, an interval between the patterns having a large width may be formed to be greater than an interval between the patterns having a small width.

Accordingly, when forming circuit patterns of the wiring pattern, the dummy pattern, and the plating pattern, it is possible to inhibit a short circuit between the patterns due to the plating process.

In detail, the size of the plating layer formed by the plating process may vary depending on a size of the seed layer serving as a seed. That is, as sizes of the seed layer, that is, a width, thickness, and area increase, the width, thickness, and area of the plating layer may be proportionally increased.

Accordingly, when the intervals of all circuit patterns are the same or similar, since the plating layer formed on the circuit patterns having a large width, thickness, and area is formed to be greater than other regions, the adjacent patterns are connected to each other, so that the circuit patterns may be short-circuited.

Accordingly, the coil member according to the embodiment may inhibit a short circuit of a circuit pattern due to a difference in size of the circuit pattern by adjusting the interval between the adjacent circuit patterns according to the size of the circuit patterns.

Therefore, the coil member according to the third embodiment may inhibit the short circuit of the circuit pattern to have improved reliability.

Figure 24:
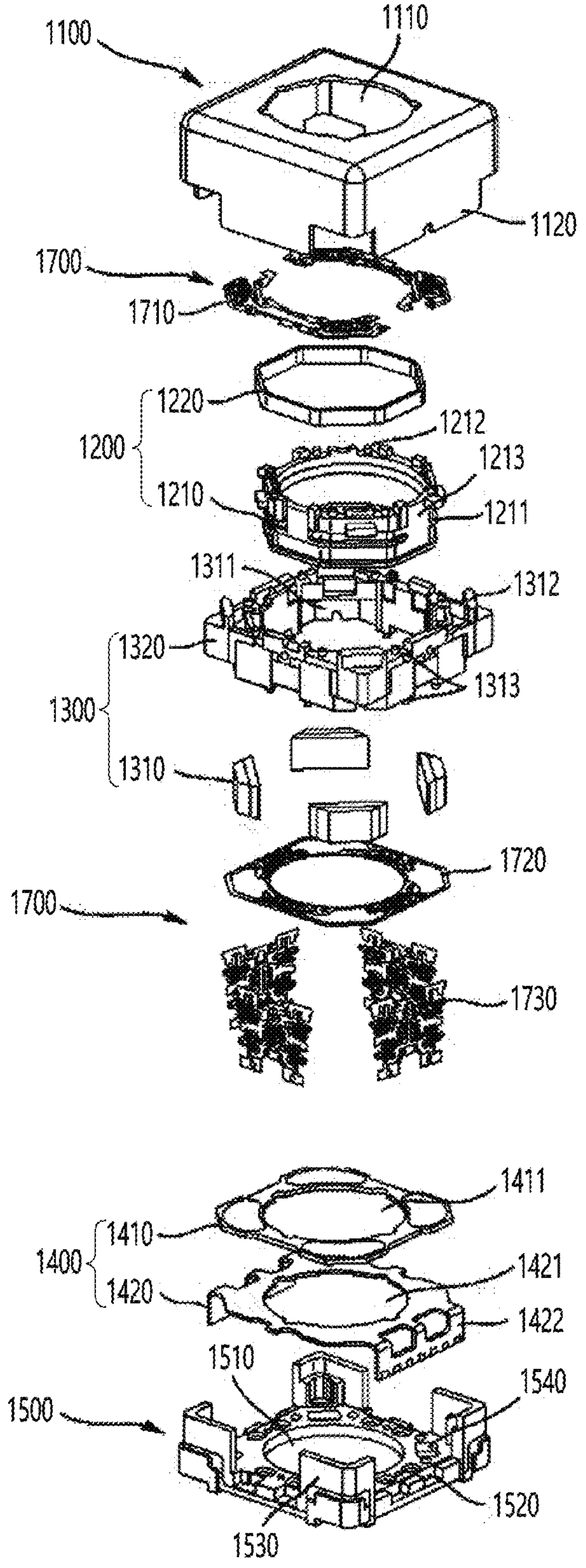
FIG. 24 is a perspective view of a camera module including the coil member according to the embodiment.

Hereinafter, a camera module including the coil member according to an embodiment will be described with reference to FIG. 24. FIG. 24 is a view showing a combined perspective view of the camera module according to the embodiment.

Referring to FIG. 24, a camera module 10 according to the embodiment includes a cover can 1100, a first mover 1200, a second mover 1300, a stator 1400, a base 1500, and an elastic unit 1600. In addition, although not shown in FIG. 15, the camera module 10 according to the embodiment may further include a printed circuit board, an IR filter, an image sensor, and the like.

The cover can 1100 accommodates the elastic unit 1600, the first mover 1200, the stator 1400, and the second mover 1300 and is mounted on the base 1500 to form an exterior of a lens driving motor. Specifically, an inner surface of the cover can 1100 is in close contact with some or all of side surfaces of the base 1500 to be mounted on the base 1500, and the cover can 1100 has a function of protecting internal components from external impacts and inhibiting penetration of external contaminants.

In addition, the cover can 1100 should also perform a function of protecting the lens driving motor or the components of the camera module from external radio wave interference generated by a mobile phone or the like. Therefore, the cover can 1100 is preferably formed of a metal material.

The cover can 1100 may be implemented as a yoke unit itself, which will be described below, or may be fixed by molding the yoke unit on the inside thereof. In addition, an opening 1110 through which a lens unit (not shown) is exposed may be formed on an upper surface of the cover can 1100, and an inner yoke (not shown) bent inside the cover can 1100 may be formed at a lower end portion of the upper surface of the cover can 1100. This inner yoke may be positioned in a concave portion 1213 formed in the bobbin 1210. In this case, the inner yoke may be disposed at a corner around the opening on an upper surface of the yoke portion or may be disposed on a side surface of the yoke portion, and the concave portion of the bobbin may be formed at a corresponding position.

In addition, the cover can 1100 may have a fastening piece 1120 formed so as to extend at least one on each surface of the lower end portion thereof, and it is possible to implement a more robust sealing function and fastening function of the lens driving motor by forming a fastening groove 1520 into which the fastening piece 1120 is inserted in the base 1500. In addition, the fastening piece and the fastening groove may not be separately present, and only one of the two may be formed.

Meanwhile, the first mover 1200 is disposed on a side surface of the lens unit in order to move the lens unit (not shown). The first mover 1200 includes the bobbin 1210 for fixing the lens unit and a first coil member 1220 provided on an outer circumferential surface of the bobbin 1210.

The lens unit (not shown) may be a lens barrel provided with one or more lenses (not shown), but the embodiment is not limited thereto, and any holder structure capable of supporting the lens may be included.

An inner circumferential surface of the bobbin 1210 is coupled to an outer circumferential surface of the lens unit to fix the lens unit. In addition, the bobbin 1210 may have a guide part 1211, which guides the winding or mounting of the first coil member 1220, on an outer circumferential surface thereof. The guide part 1211 may be integrally formed with an outer surface of the bobbin 1210, and may be formed continuously along the outer surface of the bobbin 1210 or may be formed to be spaced apart at predetermined intervals.

In addition, a spring fastening protrusion 1212, to which an upper spring 1710 or a lower spring 1720 provided on the upper side of the base 1500 to support the bobbin 1210 is fastened, may be formed on the upper and lower surfaces of the bobbin 1210.

In addition, the bobbin 1210 may further include a concave portion 1213 formed on the outer circumferential surface thereof so that the inner yoke of the cover can 1100 may be positioned between the bobbin 1210 and the first coil member 1220 wound around the bobbin 1210.

In addition, the first coil member 1220 may be guided by the guide part 1211 and wound on the outer surface of the bobbin 1210, but four individual coils may be formed on the outer surface of the bobbin 1210 at 90° intervals. The first coil member 1220 may receive power applied from a printed circuit board (not shown) to be described later to form an electromagnetic field.

Meanwhile, the second mover 1300 may be positioned to face the first mover 1200 on a side surface of the first mover 1200 and may include a magnet part 1310 disposed so as to face the first coil member 1220 and a housing 1320 to which the magnet part 1310 is fixed.

Specifically, the magnet part 1310 may be mounted to the housing 1320 by an adhesive or the like so as to be disposed at a position corresponding to an outer surface of the first coil member 1220 and may be mounted on four corners inside the housing 1320 at equivalent intervals to promote efficient use of the internal volume.

The housing 1320 may be formed in a shape corresponding to an inner surface of the cover can 1100 forming the exterior of the lens driving motor. In addition, the housing 1320 may be formed of an insulating material and may be made as an injection molding product in consideration of productivity. The housing 1320 may be a moving part for OIS driving and may be disposed to be spaced apart from the cover can 1100 by a certain distance.

In the embodiment, the housing 1320 may be formed in a hexahedral shape to be spaced apart by a predetermined distance corresponding to a shape of the cover can 1100, and upper and lower sides of the housing 1320 may be opened to support the first mover 1200. In addition, the housing 1320 may include a magnet part fastening hole 1311 or a magnet part fastening groove formed in a shape corresponding to the magnet part 1310 on a side surface thereof.

In addition, at least two stoppers 1312 that are formed to protrude at a predetermined distance from an upper surface of the housing 1320 to be in contact with the upper surface of the cover can 1100 to enable to absorb an external impact may be formed. The stopper 1312 may be formed integrally with the housing 1320.

In addition, a spring fastening protrusion 1313 to which the upper spring 1710 or the lower spring 1720 provided on the upper side of the base 1500 to be described later so as to support the housing 1320 is fastened may be formed on the upper and lower surfaces of the housing 1320.

Meanwhile, the stator 1400 is positioned to face a lower side of the second mover 1300 in order to move the second mover 1300 and has through-holes 1411 and 1421 corresponding to the lens unit that are formed in a center thereof.

Specifically, the stator 1400 may include a second coil member 1410 positioned so as to face a lower side of the magnet part 1310 and a substrate on which the second coil member 1410 is disposed on the upper side to apply power, and an OIS chip is mounted, and the substrate may be a printed circuit board 1420. That is, the second coil member 1410 may be the coil member described above with reference to FIGS. 1 to 13.

The second coil member 1410 may be mounted on the printed circuit board 1420 provided on the upper side of the base 1500 or formed on a flexible printed circuit board or a substrate, and the through-hole 1411 is formed in the center in order to pass a light signal of the lens unit (not shown). Meanwhile, when considering the miniaturization of the lens driving motor, specifically, lowering the height in a z-axis direction, which is an optical axis direction, the second coil member 1410 may be formed as a fine pattern (FP) coil that is a patterned coil and disposed on the flexible printed circuit board.

The flexible printed circuit board 1420 may be provided on an upper surface of the base 1500 to apply power to the second coil member 1410, and the through-hole 1421 corresponding to the through-hole 1411 of the second coil member 1410 is formed on the flexible printed circuit board 1420. In addition, the printed circuit board 1420 may include a terminal portion 1422 having one end or both ends facing each other bent to protrude to the lower side of the base 1500 and may be supplied with external power through the terminal portion 1422.

In addition, the embodiment may further include a hall sensor unit (not shown) mounted on a lower or upper surface of the printed circuit board 1420 so as to correspond to a position of the magnet part 1310.

The hall sensor unit senses an intensity and phase of a voltage applied to detect the movement of the magnet part 310 and a current flowing through the coil and interacts with the printed circuit board 1420 to be provided in order to precisely control the actuator.

The hall sensor unit may be provided on a straight line with respect to the magnet part 1310 and the optical axis direction, and since the hall sensor unit has to detect displacements in the x-axis and y-axis, the hall sensor unit may include two hall sensors respectively provided at adjacent two corners among corners of the printed circuit board 1420. A hall sensor receiving groove 1540 capable of accommodating the hall sensor may be formed in the base 1500. In addition, the hall sensor may be provided with one or more.

Although the hall sensor unit is provided closer to the second coil member 1410 than the magnet part 1310, considering that the strength of the magnetic field formed in the magnet part is several hundred times greater than the strength of the electromagnetic field formed in the coil, the influence of the second coil member 1410 in detecting the movement of the magnet part 1310 is not considered.

The lens unit is moved in all directions by the independent or organic interaction of the first mover 1200, the second mover 1300, and the stator 1400, so that the image focus of a subject is focused through the interaction of the first mover 1200 and the second mover 1300, and a camera shake and the like may be corrected by the interaction of the second mover 1300 and the stator 1400.

Meanwhile, the base 1500 supports the stator 1400 and the second mover 1300, and a hollow hole 1510 corresponding to the through-holes 1411 and 1421 is formed in a center thereof.

The base 1500 may function as a sensor holder to protect an image sensor (not shown) and may be provided to position an IR filter (not shown) at the same time. In this case, the IR filter may be mounted in the hollow hole 1510 formed in the center of the base 1500, and an infrared ray (IR) filter may be provided. In addition, the IR filter may be formed of, for example, a film material or a glass material, and an infrared blocking coating material may be disposed on a plate-shaped optical filter such as a cover glass for protecting an imaging surface, a cover glass, or the like. In addition, a separate sensor holder may be positioned under the base in addition to the base.

In addition, the base 1500 may be formed with one or more fixing protrusions 1530 protruding from an upper corner to face or couple to the inner surface of the cover can 1100, and such a fixing protrusion 1530 may easily guide fastening of the cover can 1100 and may achieve firm fixation after fastening. In addition, two or more fixing protrusions may be formed.

In addition, the base 1500 may have the fastening groove 1520 into which the fastening piece 1120 of the cover can 1100 is inserted. The fastening groove 520 may be formed locally on an outer surface of the base 1500 in a shape corresponding to a length of the fastening piece 1120 or may be formed entirely on the outer surface of the base 1500 so that a predetermined part of the lower end portion of the cover can 1100 including the fastening piece 1120 is inserted.

The characteristics, structures and effects described in the embodiments above are included in at least one embodiment but are not limited to one embodiment. Furthermore, the characteristic, structure, and effect illustrated in each embodiment may be combined or modified for other embodiments by a person skilled in the art. Thus, it should be construed that contents related to such a combination and such a modification are included in the scope of the present disclosure.

In addition, embodiments are mostly described above, but the embodiments are merely examples and do not limit the present disclosure, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present disclosure defined in the following claims.

The invention claimed is:

1. A coil member comprising:

a substrate including a first surface and a second surface opposite to the first surface; and a circuit pattern disposed on the first surface and including a plurality of metal layers sequentially stacked on the substrate, wherein the plurality of metal layers include a first metal layer disposed on and in direct physical contact with the substrate, a second metal layer disposed on and in direct physical contact with the first metal layer, a third metal layer disposed on and in direct physical contact with the second metal layer, and a fourth metal layer disposed on and in direct physical contact with the third metal layer, and wherein the fourth metal layer is in contact with top and side surfaces of the third metal layer and spaced apart from the substrate.

2. The coil member of claim 1, comprising:

a plurality of bridge portions disposed protruding from an end of the substrate; and a shield layer disposed on the plurality of bridge portions, wherein the plurality of bridge portions are integrally formed with the substrate, wherein the plurality of bridge portions include a first bridge portion and a second bridge portion, and wherein the first bridge portion and the second bridge portion are disposed to face each other.

3. The coil member of claim 2, comprising:

a protective layer disposed on the circuit pattern, wherein the circuit pattern includes a wiring pattern, a plating pattern, and a dummy pattern disposed on the substrate, wherein the protective layer is disposed on the wiring pattern, the plating pattern, and the dummy pattern, and wherein the shield layer and the protective layer are integrally formed.

4. The coil member of claim 3, wherein a length of each bridge portion of the plurality of bridge portions is smaller than a distance between an end of the substrate and an outermost wiring pattern of the wiring pattern.

5. The coil member of claim 3, wherein the protective layer is disposed between the substrate and the circuit pattern.

6. The coil member of claim 3, wherein the protective layer includes a first region close to an end of the substrate and a second region farther from the end of the substrate than the first region, and wherein the first region has a thickness greater than a thickness of the second region.

7. The coil member of claim 3, wherein the protective layer includes a first region close to an end of the substrate and a second region farther from the end of the substrate than the first region, and wherein the first region and the second region have different colors.

8. The coil member of claim 2, wherein a thickness of each bridge portion of the plurality of bridge portions decreases toward one end thereof.

9. The coil member of claim 3, wherein the plurality of bridge portions are disposed at a position overlapping the plating pattern.

10. A camera module comprising:

a first mover disposed on a side surface of a lens unit to move the lens unit;

a second mover positioned to face the first mover on a side surface of the first mover;

a stator positioned to face a lower side of the second mover and configured to move the second mover and having a through-hole corresponding to the lens unit formed in a center thereof; and a base supporting the stator and the second mover and having a hollow hole corresponding to a through-hole of the second mover formed in a center thereof, wherein the stator includes a circuit board and a coil member disposed on the circuit board, wherein the coil member includes:

a substrate including a first surface and a second surface opposite to the first surface;

a first circuit pattern disposed on the first surface; and a plurality of bridge portions disposed protruding from an end of the substrate, wherein the bridge portions are integrally formed with the substrate, and a shield layer is disposed on the bridge portions.

11. The coil member of claim 6, wherein the first region has a maximum thickness greater than that of the second region.

12. The coil member of claim 3, wherein the protective layer and the shield layer include the same material.

13. The coil member of claim 3, wherein the protective layer includes a first protective layer disposed on the first surface and a second protective layer disposed on the second surface, wherein the first protective layer and the second protective layer have different thicknesses.

14. The coil member of claim 13, wherein the thickness of the first protective layer is smaller than the thickness of the second protective layer.

15. The coil member of claim 3, wherein at least one of the wiring pattern, the plating pattern, and the dummy pattern includes the first metal layer, the second metal layer, the third metal layer, and the fourth metal layer.

16. The coil member of claim 1, wherein an upper surface of the fourth metal layer has a surface in a direction away from the substrate.

17. The coil member of claim 9, wherein the plurality of bridge portions support the plating pattern.

18. The coil member of claim 9, wherein a width of each bridge portion of the plurality of bridge portions is greater than or equal to a width of the plating pattern.

19. The coil member of claim 9, wherein an end of the plating pattern is disposed inside an end of the plurality of bridge portions.

20. The coil member of claim 9, wherein the shield layer is disposed on the plating pattern.

* * * * *